(12) United States Patent
Bowser

(10) Patent No.: US 7,155,407 B2
(45) Date of Patent: Dec. 26, 2006

(54) ACCOUNT MANAGEMENT SYSTEMS AND METHODS

(75) Inventor: Reginald Bowser, Matthews, NC (US)

(73) Assignee: RolloverSystems, Inc., Charlotte, NC (US)

( * ) Notice: Subject to any disclaimer, the term of this patent is extended or adjusted under 35 U.S.C. 154(b) by 8 days.

(21) Appl. No.: 10/295,059

(22) Filed: Nov. 14, 2002

(65) Prior Publication Data

US 2004/0098323 A1    May 20, 2004

(51) Int. Cl.
*G06F 17/60* (2006.01)

(52) U.S. Cl. .................... 705/35; 705/36 R; 705/37
(58) Field of Classification Search ............ 705/36, 705/37, 35
See application file for complete search history.

(56) References Cited

U.S. PATENT DOCUMENTS

| | | | | |
|---|---|---|---|---|
| 6,014,645 | A * | 1/2000 | Cunningham | 705/38 |
| 6,041,313 | A | 3/2000 | Gilbert et al. | 705/36 |
| 6,058,376 | A | 5/2000 | Crockett | 705/35 |
| 6,064,986 | A | 5/2000 | Edelman | 705/36 |
| 6,411,939 | B1 | 6/2002 | Parsons | 705/35 |
| 2001/0034684 | A1 | 10/2001 | Cushing et al. | 705/35 |
| 2001/0037276 | A1 | 11/2001 | Kelly et al. | 705/36 |
| 2002/0023033 | A1 * | 2/2002 | Campbell et al. | 705/36 |
| 2002/0069077 | A1 | 6/2002 | Brophy et al. | 705/1 |
| 2002/0069081 | A1 | 6/2002 | Ingram et al. | 705/1 |
| 2002/0077951 | A1 | 6/2002 | Gilbert et al. | 705/36 |
| 2002/0091604 | A1 | 7/2002 | Loeper | 705/36 |
| 2002/0161920 | A1 * | 10/2002 | Etoh | 709/238 |
| 2002/0198809 | A1 * | 12/2002 | Daley et al. | 705/36 |

* cited by examiner

*Primary Examiner*—Vincent Millin
*Assistant Examiner*—Debra Charles
(74) *Attorney, Agent, or Firm*—Winston & Strawn LLP

(57) ABSTRACT

Methods for providing an account rollover marketplace which includes providing a consumer interface with which consumers interact to pursue account rollovers, permitting each consumer to interact with the consumer interface to request to receive multiple rollover offers, and presenting multiple account rollover offers from different financial institutions to a particular one of the consumers in response to that consumer requesting rollover offers. Also included are methods for alerting a financial institution of a transaction, which includes providing a consumer with an opportunity to enter application information for a rollover account application when that consumer selects one of a number of rollover offers, storing the information entered by that consumer, automatically sending an alert to the financial institution whose rollover offer that consumer selected when a completed application for that selected offer is received, and making the stored information electronically available to the financial institution to which the alert is sent.

62 Claims, 38 Drawing Sheets

It's your future.

Upon leaving your job, one of the first steps to saving responsibly for your retirement could be rolling over your 401(k) assets to an Individual Retirement Account (IRA). Our easy-to-use tools and simple form let you complete your rollover faster than you ever imagined.

Our network of top-tier financial institutions are waiting to compete for your Rollover IRA. So take control of your future and roll over now!

BEGIN YOUR ROLLOVER NOW ▶

Rollover in 3 easy steps

1. First, choose the Rollover IRA options that interest you.

2. Next, we'll match you with up to 5 competing financial institutions that meet your needs. Just compare offers and choose one.
Learn more about our top-rated financial companies ▸

3. Print, sign and mail your Rollover Form and you're done!

BEGIN YOUR ROLLOVER NOW ▸

Fig. 8

About You

The questions on this page give us a basic snapshot of you.

Your Profile:

Name: First / Middle / Last

Address: Street / City / State / ZIP Code

Marital Status:

Age:

Country of Citizenship: United States

Annual Household Income:

Login Information:

- Email:
  - *Please re-enter email for verification*
- Create a Password:
  - *Please re-enter password for verification*

Today's Rollover:

- Do you have a promotional code?
- How many 401(k) plans would you like to roll over? 1
- If more than 1, would you like to pool your assets? Yes Click here to STOP and save your place: STOP

Your Rollover

The following questions will help us find the best financial institutions for your needs. Please review all options and specify your interests. If you need help, roll your mouse over the lightbulb icon and a tip will appear in the left-hand column. Please note: Fields in bold are required.

219    224    216

‹ PREVIOUS PAGE    [NEXT]    [SUBMIT]

Rollover Details

○ Please give this Rollover a name:

My First Rollover

○ Amount(s) you wish to roll over:

| 401(k) Account Number | Account Balance | |
|---|---|---|
| 123456789 | $ 500 | .00 |
| 987654321 | $ 12000 | .00 |

What's Important to You?

Which investment options are you most likely to use with your new Rollover IRA? *Check all that apply*

- ☑ Mutual Funds
- ☑ Stocks
- ☑ Bonds / Fixed Income
- ☐ CD / Certificate of Deposit How many changes/trades did you make to your allocations in your 401(k) plan?

[2 ▾] per [Quarter ▾]

Please indicate the level of risk that best describes your investment philosophy:

[Conservative/Moderate ▾]

When considering a Financial Institution to manage your Rollover IRA, what is important to you? *Check all that apply*

Account Management Fees
- ☐ "No-load" (no-fee) mutual fund transactions
- ☑ Low-fee stock trading Financial Planning Advice
- ☑ Access to a Financial Planner [1 ▾] times per [Month ▾]

Investment Research and Expertise
- ☐ Free access to stock/bond research reports Specialized Products and Services
- ☐ Access to Initial Public Offerings (IPO's)
- ☑ Extended Hours Trading Service and Convenience
- ☐ I'd like to make changes/trades to my Rollover IRA through a secure online account
- ☐ Access to a Financial Institution Branch Office (if available)
- ☐ Access to a 24 hour customer service telephone line

◂ PREVIOUS PAGE          [NEXT ▸]          STOP

Fig. 11

Your Offers

Congratulations! We've identified 5 financial institutions that meet or exceed your needs. Please compare your rollover offers and select a financial institution.

| | ABC FINANCIAL | ABC FINANCIAL | Acme Financial Company | ABC FINANCIAL | xyz Bank |
|---|---|---|---|---|---|
| | SELECT ▸ | SELECT ▸ | SELECT ▸ | SELECT ▸ | SELECT ▸ |
| More Information | ABC Financial Safety Plus | ABC Financial Superflex | Acme Financial | ABC Financial Provantage | XYZ Bank |
| Rollover Amount | $40,000.00 | $40,000.00 | $40,000.00 | $40,000.00 | $40,000.00 |
| Annual Fees | None | None | None | None | $60 |
| Free Trades per Year | 3* | 3* | 3* | 3* | None |
| Online Advice and Tools | Yes* | Yes* | Yes* | Yes* | Yes |
| Access to Stock / Bond Research Reports | Free* | Free* | No | Free* | Free* |
| Access to Initial Public Offerings (IPO's) | No | No | Free | No | Free |
| Access to Financial Advisor | Yes* | Yes* | Yes* | Yes* | Yes* |
| Online Account Access | Free* | Free* | Yes* | Free* | Free* |
| Access to Institutional Branch Office | Yes* | Yes* | Yes* | Yes* | Yes* |
| Extended Hour Trading | Yes* | Yes* | Yes* | Yes* | No |
| 24-Hour Customer Service | No | No | Yes* | No | XYZAccess |
| Special Offers | 3 Free Trades | 3 Free Trades | Free Year of AcmeGiving | 3 Free Trades | Free Year of XYZ Online |
| | SELECT ▸ | SELECT ▸ | SELECT ▸ | SELECT ▸ | SELECT ▸ |

Fig. 12B

Your Offers

- ABC Financial The Safety Plus Plan
- ABC Financial The Superflex Plan
- ABC Financial The ProVantage Plan
- XYZ Bank
- Acme Financial

OFFER DETAILS

ABC FINANCIAL
ABC Financial
The Safety Plus Plan

To choose this offer and continue, click here.
[ Select Offer ]

If you're looking for FDIC insurance protection on your investment options, the Safety Plus IRA is for you. With the Safety Plus IRA, you'll earn a competitive return on your investment while enjoying the security of FDIC insurance protection. What's more, Safety Plus gives you the flexibility to choose from a wide variety of savings and time accounts designed to fit your specific retirement income needs.

Rollover Amount   $40,000

Annual Fees   None

Free Trades per Year   3

Once the account is approved and opened, you will receive 3 FREE trades. Your 3 free trades will be credited to your account for the next 3 trades you make after your account has been opened. The trade credits must be used individually for the next 3 trades in each account. They cannot be deferred or combined.

Please Note: The trade confirmations will show a commission charge for each trade. A commission credit will appear on the next account statement following each of the next three trades.

*Corporate, Partnership and Investment Club Accounts are not eligible to participate in the Free Trade program. You can receive up to 10 referral credits. Free trade credits will expire one year after issue date. Minimum $1,000 initial deposit. Other limits may apply.

Online Advice and Tools   Yes

A variety of specialized products, tools, educational kits and investment planning guides are available online from ABC Financial Company.

Fig. 12C

| | |
|---|---|
| Access to Stock / Bond Research Report | Free<br><br>ABC Financial Company offers a wide variety of accessible research tools for your consumption. In addition you can subscribe to our free quarterly publication Your Financial Future for in-depth articles and analysis of current financial issues |
| Access to Initial Public Offerings (IPOs) | No |
| Access to Financial Advisor | Yes<br><br>At ABC Financial Company, we take pride in doing business face-to-face. That means you'll not only find us online, you'll often find us right around the corner as well<br>Our investment representatives live and work alongside the investors they serve. Doing so has taught us a valuable lesson. Investing is not a one-size-fits-all proposition. Individual investors are real people, each with his or her own personal long-term financial needs and goals<br>At ABC Financial we offer real solutions – solutions tailored specifically to your individual needs and goals |
| Online Account Access | Free<br><br>The Internet can substantially increase the ease and convenience of placing orders for securities. Online customers should not assume however, that the Internet channel will always be available. Any computer system whether it is yours, your Internet Service Providers or that of a financial services firm may experience unscheduled outages or slowdowns for a variety of reasons. Although precautions are taken to enable systems to handle heavy use, neither ABC Financial Company, nor any other online financial service provider, can promise complete reliability under all circumstances. Our system performance and that of others critical to the transaction process is subject to a variety of operational risks including heavy stress during peak times and undetected hardware or software failures. While we always seek to minimize risks they cannot be entirely eliminated. The purpose of this message is to make sure customers are aware of these additional risks and suggest some ways to reduce exposure to them<br><br>ABC Financial Company maintains sophisticated systems and employs experienced registered representatives to process transactions submitted via the Internet. However, information processing and communications systems both those of ABC Financial Company and third-party vendors on whom we depend are subject to occasional congestion, technological problems or in extreme cases outages. Beyond our proprietary systems third party providers include NASDAQ systems, market centers that execute orders and quotation services. The failure of a critical system for a significant period of time may limit our ability to rapidly process an Internet transaction |
| Access to Institutional Branch Office | Yes<br><br>ABC Financial is one of the largest financial services firms in terms of convenient locations, with more than 8,600 offices located throughout the United States, Canada and United Kingdom |

Fig. 12D

| | |
|---|---|
| Extended Hours Trading | Yes<br>ABC Financial Company does offer Extended Hours Trading. Extended hours trading gives you the opportunity to place orders before major U.S. Markets are open and after they are closed using the REDIBook® Electronic Communications Network (ECN). Your orders are not routed to an Exchange but are paired with other orders through the ECN. It is important to note that unlike trading during regular hours, extended hours trading involves additional risks such as wider spreads, lack of liquidity, higher volatility, communication delays, lack of access to other markets and market information, risk of changing prices and risk of news announcements. |
| 24-Hour Customer Service | No |
| Special Offers | <br>241<br>Offer available to new ABC Financial customers who open individual, joint, retirement and certain grantor trust accounts. Custodial, partnership and corporate accounts not eligible. *Each free trade valued up to $45. Minimum account balance $1,000. Account must be opened online via this page and remain open for 6 consecutive months, funds transferred from an existing ABC Financial account not eligible. The free trades are valid for 30 calendar days from the account opening date. Unused free trades will expire 30 days from account opening. One offer per household, this offer is nontransferable. U.S. residents only, void where prohibited, standard terms and conditions apply. Offer subject to change at any time without notice. May not be combined with other offers.<br>© 2002, ABC Financial Investor Services, Inc. Member NYSE/SIPC. Access to services and your account may be affected by market conditions, system performance or for other reasons. Online market orders are $9.95 - $14.95 depending on trading activity. |

Fig. 12E

| Your 401(k) Plan(s) | | | |
|---|---|---|---|
| Account # | 123456789 | Sponsor Address | 123 Widget Way |
| Amount | $ 500 | City | Any City |
| Plan Sponsor | Widgets Inc | State | Connecticut |
| Phone # | 555-555-1234 | ZIP Code | 12345 |
| Account # | 987654321 | Sponsor Address | 123 Global Ave |
| Amount | $ 12000 | City | Any City |
| Plan Sponsor | Global Co | State | Connecticut |
| Phone # | 555-555-1234 | ZIP Code | 12345 |

243

Additional Info

ABC FINANCIAL

Acme Financial requires the following additional information to complete your Rollover IRA

Chase

| | |
|---|---|
| Home Phone. | 555-555-1234 |
| Social Security Number. | 123-45-6789 |
| Your date of birth. | Jul ▼ 11 ▼ 1969 ▼ |
| Mother's Maiden Name. | Smith |
| Client Brokerage Account Number. | 123546 |
| Chase Money Market Account Number. | 132456 |
| Citizenship | ⦿ US Citizen |
| | ○ Resident Alien |
| | ○ Non-Resident Alien |
| | if non-resident, fill in country below. |
| Country (if non-resident alien). | |
| Are you a resident of Arizona, California, Idaho, Louisiana, New Mexico, Texas, Washington or Wisconsin and have you designated someone other than, or in addition to, your spouse as beneficiary? | ○ Yes<br>⦿ No |

Current Employer

| | |
|---|---|
| Company Name. | MyCompany, Inc |
| Address: | 132 Elm Street |
| City | Any City |
| State. | Connecticut ▼ |
| Zip Code. | 12345 |
| Work Phone: | 555-555-1234 |
| Current Occupation: | Sales |

Fig. 13B

Next Steps

Thank you for completing your rollover. You have taken an important step towards securing a healthy retirement.

❶ Print 

PRINT your Rollover IRA application by clicking on the PRINT button above. (This instructions page will be printed with the application.)

❷ Sign 

SIGN your Rollover IRA application in the appropriate space. This is a very important step. We cannot complete your rollover unless it contains the appropriate signature(s).

❸ Attach 

ATTACH a copy of your last 401(k) statement. We require this to complete your rollover application and have your assets transferred to your new account.

❹ Mail 

MAIL the application to the address below. As soon as your application is received, we will notify you via email. IMPORTANT: Your Rollover cannot be completed until your signed application has been received.

Acme Financial
C/O RolloverMarket, Inc.
2815 Coliseum Drive, Suite 630
Charlotte, NC 28217

Have questions?

Please feel free to contact RolloverMarket via our toll-free number, (800) 444-5678, or send us an email at customerservice@rollovermarket.com

② PLEASE SELECT THE SOURCE OF THE ROLLOVER

☑ DIRECT ROLLOVER. To fund your Rollover IRA with assets from an employer-sponsored retirement plan, such as a 401(k) or pension plan. Also, complete the Direct Rollover Authorization form and attach to this form.

If you're opening a Rollover IRA and wish to preserve your ability to transfer funds from this account to another qualified retirement plan in the future, you may not make additional annual contributions to the Rollover IRA. Please consult with your tax advisor before making additional contributions to a Rollover IRA.

Complete any forms from your employer and provide them with your Acme Rollover IRA account information

| Widgets, Inc | $5,000 00 | 11/16/2002 | 555-555-1234 |
|---|---|---|---|
| Name of employer sponsoring the plan | Approximate total value of distribution | Expected distribution date (mm/dd/yy) | Employer telephone number |

By signing this application, I elect that my IRA assets identified above be considered a rollover. This election is required by the IRS to qualify my contribution as a rollover contribution ☐ Transfer of existing Rollover IRA from another financial institution. Also complete the Account Transfer Form.

☐ Funds you have withdrawn from another institution. Rollover assets you have withdrawn from an IRA within the past 60 days

PLEASE NOTE: You cannot directly roll over from a qualified plan to a Roth IRA. You must roll over to a Traditional IRA first.

③ DESIGNATE YOUR BENEFICIARY(IES)

| Name and address | Birth date | Social Security # | Relationship | Type of Beneficiary | Share % |
|---|---|---|---|---|---|
| John Doe Any City, CT | 07/20/1969 | 123-45-6789 | Husband | ☑ Primary ☐ Contingent | 100% |
| | | | | ☐ Primary ☐ Contingent | |
| | | | | ☐ Primary ☐ Contingent | |
| | | | | ☐ Primary ☐ Contingent | |

*PLEASE NOTE Type of beneficiary is required. The total percentages for primary beneficiaries must equal 100% The total percentages for contingent beneficiaries must equal 100%. If additional space is required, please attach a separate sheet with additional beneficiaries.

☐ I have attached a separate sheet with additional beneficiaries.

④ REFERRAL

IF YOU WERE REFERRED BY AN EXISTING ACME FINANCIAL CUSTOMER, PLEASE PROVIDE THE FOLLOWING INFORMATION SO THAT WE MAY THANK THEM:

_____

_____

OTHER _____

⑤ AGREEMENT TO TERMS

By signing this Agreement, I acknowledge that (1) I agree to read and be bound by the terms of the ACME FINANCIAL Account Agreement Booklet containing the IRA Custodial Agreement and Disclosure Statement as currently in effect and as amended from time to time I also understand that I have the right to cancel my IRA within seven days from the date I receive the ACME FINANCIAL Account Agreement Booklet containing the IRA Custodial Agreement and Disclosure Statement. (If I do not receive or understand the ACME FINANCIAL Account Agreement Booklet, I will notify ACME FINANCIAL.) (2) ACME FINANCIAL does not provide legal or tax advice and will not advise me concerning the nature, potential value, or suitability for me of any unsolicited security transaction or investment strategy I understand that I have the right to direct the investment and reinvestment of the contributions to my Account and hereby appoint ACME FINANCIAL as my agent to execute directions, as Broker, under the terms of the IRA Custodial Agreement. (3) I hereby establish a ACME FINANCIAL Bank Self Directed Individual Retirement Custodian Account, and certify the accuracy of all information provided, in each case effective upon acceptance by ACME FINANCIAL Bank. (4) In the case of a rollover contribution, I irrevocably elect to treat this as such, as stated in the Rollover IRAs section of the IRA Disclosure Statement (5) I authorize ACME FINANCIAL to make inquiries for the purpose of verifying my creditworthiness and to provide information regarding my performance under these agreements to credit reporting agencies and to its affiliates I further understand that ACME FINANCIAL may share this information with its affiliates to determine my eligibility for other products and services they may offer I may opt out of such information sharing by providing ACME FINANCIAL with written notification. I understand that, upon my request, ACME FINANCIAL will tell me whether a credit report was requested and provide the name and address of the agency that furnished it (6) AGREEMENT TO ARBITRATE CONTROVERSIES 1. Arbitration is final and binding on the parties 2 The parties are waiving their right to seek remedies in court, including the right to jury trial 3. Pre-arbitration discovery is generally more limited than and different from court proceedings. 4. The arbitrators' award is not required to include factual findings or legal reasoning and any party's right to appeal or to seek modification of rulings by the arbitrators is strictly limited. 5. The panel of arbitrators will typically include a minority of arbitrators who were or are affiliated with the securities industry. I agree that any controversy relating to any of my accounts or any agreement that I have with you will be submitted to arbitration conducted only under the provisions of the Constitution and Rules of the New York Stock Exchange, Inc. or pursuant to the code of the Arbitration of the National Association of Securities Dealers, Inc. Arbitration must be initiated by service upon the other party of a written demand for arbitration or notice of intention to arbitrate. Judgment, upon any award rendered by the arbitrator, may be entered in any court having jurisdiction. No person shall bring a putative or certified class action to arbitration, nor seek to enforce any pre-dispute arbitration agreement against any person who has initiated in court a putative class action, or who is a member of a putative class who has not opted out of the class with respect to any claims encompassed by the putative class action until (i) the class certification is denied, or (ii) the class is decertified; or (iii) the customer is excluded from the class by the court. Such forbearance to enforce an agreement to arbitrate shall not constitute a waiver of any rights under this agreement except to the extent stated herein.

Under the penalties of perjury, I certify that the Social Security Number/Taxpayer Identification Number shown on this form is correct, and that I am not subject to backup withholding under the provisions of the Internal Revenue Code This certification is required by U S Government regulations

| | FOR INTERNAL USE ONLY |
|---|---|
| | CUSTODIAN ACCEPTANCE TO WATERHOUSE BANK BY |
| X Account Holder Signature        Date | X Signature        Date |

PLAN ADMINISTRATOR DELIVERY INSTRUCTIONS

Custodian for Retirement Plan Accounts Acme Bank, N A an affiliate of Acme Investor Services Inc ©2001 TD Waterhouse Investor Services, Inc Established 1979 Member NYSE/SIPC Access to services and your account may be affected by market conditions system performance or for other reasons $9.95 rate applies to market orders for Acme Select customers (36 trades or more per calendar quarter) Otherwise market orders are $12 Limit orders just $3 more Visit Web site for details on Acme Select. All rates apply up to 5,000 shares Accounts are carried by National Investor Services Corp., an affiliate of Acme Investor Services, Inc

Fig. 14C

⑥ PLAN ADMINISTRATOR DELIVERY INSTRUCTIONS

IMPORTANT INFORMATION REGARDING YOUR DIRECT ROLLOVER

INFORMATION

A Direct Rollover is the transfer of your retirement account from your (former) employer's retirement plan to an IRA or another employer sponsored retirement plan. When you conduct a Direct Rollover, two transactions occur 1. A distribution of your account from your (former) employer's retirement plan and,
2. A rollover of your account to an IRA or another employer's retirement plan

PLEASE RESPOND TO THE FOLLOWING QUESTIONS REGARDING YOUR DIRECT ROLLOVER TO TD WATERHOUSE

- Does your (former) employer require you to complete a distribution form(s) to effect a distribution from the retirement plan?

☐ Yes  ☐ No

*(If "Yes", your employer's distribution form is in addition to the Acme Rollover IRA Application and Direct Rollover Authorization forms. Speak to your (former) employer for more information and to expedite your rollover.)*

- Will your (former) employer release your information to a third party (i.e. Acme)?

☐ Yes  ☐ No

*(If "No", Acme cannot conduct any follow-ups on your rollover transaction. Consequently, you may want to follow up with your (former) employer to ensure that your distribution is handled in a timely manner.)*

- Will your (former) employer mail your distribution check directly to you instead of the financial institution of your choice?

☐ Yes  ☐ No

*(If "Yes", this may delay the rollover of your account. Mailing your distribution check directly to you can result in additional time that your money remains uninvested. Ask your employer if it is possible to send your distribution check directly to Acme.)*

The process of rolling over your retirement plan may take longer than you expect. To avoid delays, be sure that you have received, completed and signed all required forms. If you have any questions, call our Retirement Plans Customer Service Representatives at (800) 555-1234 and select option 4, then option 4 again.

©2001 Acme Investor Services, Inc Member NYSE/SIPC All rights reserved

ACME 2004 Rev 12/01

Fig. 14D

FI SETUP

▶ Use this screen to add, edit Financial Institutions

| Name | Address | Contact Info. |
|---|---|---|
| American Century | 100 Maple St. Miami, FL 55555 | Mike Jones (555) 555-5555 |
| American Express | 100 Elm St. New York, NY 55555 | John Smith (555) 555-5555 |
| Chase | One Chase Square Floor T6 Rochester, NY 14643 | Beth Van Vliet (585) 258-5603 |
| Morgan Stanley | 100 Birch Ln. Hartford, CT 55555 | John Doe (555) 555-5555 |
| TD Waterhouse Investor Services | 100 Wall Street New York, NY 10005 | Liz Butler (212) 908-7587 |

Fig. 15

MENU

CORPORATE INFO SETUP

▸ Welcome to RolloverHQ. Please follow the instructions below to setup your corporate information.

This information will be displayed on the RolloverMarket website in the "RolloverMarket Network" section. It should contain general, marketing-oriented information about your institution.

Note: This is not the information a plan participant will see when viewing a rollover offer from your institution. That information is inserted into individual filters on the Filters page.

Company Logo

258 — *Logo should be .gif or .jpg or .jpeg and must be no wider than 100 pixels.*

To change your logo:

1. Click Browse and find your file:

[          ] Browse .

2. Click Save Changes to save your file

Company Description

```
TD Waterhouse Investor Services, Inc. is a
subsidiary of TD Waterhouse
   Group, Inc., a wholly-owned
subsidiary of the Toronto-Dominion Bank. TD
   Waterhouse Group, Inc. provides
investors and financial advisors with a
```
260

Disclosures

[                                    ]
262

( SAVE CHANGES ▸ )
264

CHASE — 286

278 — Tuesday, August 27, 2002
280 — Liz Butler
282 — change password
284 — log out

- FILTERS
- REPORTS
- INFO SETUP
- USER SETUP
- NEWS

FILTERS > CREATE

► This page will allow you to create a new filter. Be aware that these changes will be automatically uploaded to the RolloverMarket database and will affect your rollover volume.

We recommend that you contact your RolloverMarket Relations Manager before creating a new filter.

Filter Name: [_____] 288

290 — SAVE CHANGES ►

Primary Filtering Criteria (Eligibility)

Rollover Amount
Greater than or equal to $ [____].00
and less than or equal to $ [____].00  } 294

State and ZIP Codes
☐ All fifty states  ☐ DC
☐ AL ☐ HI ☐ MA ☐ NM ☐ SD
☐ AK ☐ ID ☐ MI ☐ NY ☐ TN
☐ AZ ☐ IL ☐ MN ☐ NC ☐ TX
☐ AR ☐ IN ☐ MS ☐ ND ☐ UT
☐ CA ☐ IA ☐ MO ☐ OH ☐ VT
☐ CO ☐ KS ☐ MT ☐ OK ☐ VA
☐ CT ☐ KY ☐ NE ☐ OR ☐ WA
☐ DE ☐ LA ☐ NV ☐ PA ☐ WV
☐ GA ☐ ME ☐ NH ☐ RI ☐ WI
☐ FL ☐ MD ☐ NJ ☐ SC ☐ WY

296

ZIP Codes 298
[_____]
(Separate multiple ZIP codes with commas)

Age
☐ Select All
☐ Under 20  ☐ 36-40  ☐ 56-60
☐ 20-25     ☐ 41-45  ☐ 61-65
☐ 26-30     ☐ 46-50  ☐ 66-70
☐ 31-35     ☐ 51-55  ☐ Over 70

300

Annual Household Income
☐ Select All
☐ Less than $25,000   ☐ $75,000 to $100,000   ☐ $200,000 to $250,000
☐ $25,000 to $50,000  ☐ $100,000 to $150,000  ☐ $250,000 to $300,000
☐ $50,000 to $75,000  ☐ $150,000 to $200,000  ☐ Over $300,000

Secondary Filtering Criteria (Matchmaking)

Investment Options — Select Plan Participants who are interested in the following investment options.
- ☑ Mutual Funds
- ☑ Stocks
- ☑ Bonds/Fixed Income
- ☐ Certificates of Deposit

Trades — Select Plan Participants who are interested in making

Greater than ▼ 5 ▼ trades per Year ▼

... 2 ▼ ...

Sign up today and
receive two free
trades per year.

Risk Assessment — Select Plan Participants who prefer the following level of risk.
- ☑ Conservative
- ☐ Conservative-Moderate
- ☐ Moderate
- ☐ Moderate/Aggressive
- ☐ Aggressive

Financial Planning / Advice — Select Plan Participants who are interested in Financial Planning / Advice
- ☑ Access to a financial Advisor  2 ▼ times per Year ▼

... Yes ▼

An Acme Financial
Assistant can work
with you to achieve

Investment Research and Expertise — Select Plan Participants who are interested in Investment Research and Expertise
- ☐ Free access to stock/bond research reports ... No ▼

Service and Convenience — Select Plan Participants who are interested in the following Service and Convenience options:

318 — ☐ Making changes/trades to a Rollover IRA through a secure online account
- Offer Page Text: No
- Disclosure: [          ]

☐ Access to a Financial Institution Branch Office (if available)
- Offer Page Text: No
- Disclosure: [          ]

☐ Access to a 24 hour customer service telephone line
- Offer Page Text: [          ]
- Disclosure: [          ]

Additional Offer Page Info

Marketing Information — Disclosure: [          ]
324

Annual Fees — Offer page text: ○ None ○ Yes $ [    ] per year
- Disclosure: [          ]
326

Online Advice and Tools — Offer page text: No
- Disclosure: [          ]
328

( SAVE CHANGES ▶ )   ( CANCEL CHANGES ▶ )
   330              332

Fig. 20

DP SETUP

Super User

▲ Here you may add, edit or delete Distribution Partners.

342

| Name | Address | Contact Info. |
|---|---|---|
| Cydecor<br>Ref Code: RMKT2 | 500 South College Street<br>Suite 1200<br>Charlotte, NC 28202 | Seenu Tullun<br>(704) 333-6297 |
| HR Monster<br>Ref Code: hrmon | 890 Post<br>San Francisco, CA 94115 | Jeff Johnson<br>(415) 578-7789 |
| Human Resources R Us<br>Ref Code: dp1001 | 100 HR Street<br>Suite 300<br>Houston, TX 01923 | Tim Merril<br>(555) 555-5557 |

ROLLOVERS

▶ Welcome to RolloverHQ Administrated.

There are currently 4 new Rollover IRA customers in your queue that need to be assigned to brokers. Assigning accounts to brokers is easy. Simply choose a broker to assign the new account and then click the ASSIGN button. Your broker will automatically receive access to the account.

| # | Rollover Amount | Application Receipt Date | Application Process/Submission Date | Assigne(ed) To: | |
|---|---|---|---|---|---|
| 1029 | $18,930 | 13-oct-01 | 13-oct-01 | Eric Sloan | Assign |
| 1030 | $5,100 | 13-oct-01 | 16-oct-01 | Eric Sloan | Assign |
| 1031 | $1,002 | 13-oct-01 | 16-oct-01 | Eric Sloan | Assign |
| 1032 | $510 | 13-oct-01 | 17-oct-01 | Eric Sloan | Assign |
| 1033 | $8,030 | 13-oct-01 | 17-oct-01 | Cathy Craib | |
| 1034 | $2,049 | 13-oct-01 | 17-oct-01 | Joe Facsay | |
| 1035 | $966 | 13-oct-01 | 17-oct-01 | Joe Facsay | |
| 1036 | $22,805 | 13-oct-01 | 17-oct-01 | Eric Sloan | |
| 1037 | $14,150 | 13-oct-01 | 19-oct-01 | Joe Facsay | |
| 1038 | $11,002 | 13-oct-01 | 22-oct-01 | John Crisafulli | |
| 1039 | $6,710 | 13-oct-01 | 22-oct-01 | John Crisafulli | |
| 1040 | $508 | 13-oct-01 | 22-oct-01 | Joe Facsay | |
| 1041 | $18,930 | 13-oct-01 | 23-oct-01 | Cathy Craib | |
| 1042 | $5,100 | 13-oct-01 | 24-oct-01 | Amy Driscoll | |

Fig. 24

ROLLOVERS

▸ There are currently 4 new Rollover IRA customers in your queue

| | # | Rollover Amount | Application Receipt Date | Application Process/Submission Date |
|---|---|---|---|---|
| NEW! | 1029 | $18,930 | 13-oct-01 | 13-oct-01 |
| NEW! | 1030 | $5,100 | 13-oct-01 | 16-oct-01 |
| NEW! | 1031 | $1,002 | 13-oct-01 | 16-oct-01 |
| NEW! | 1032 | $510 | 13-oct-01 | 17-oct-01 |
| | 1033 | $8,030 | | 17-oct-01 |
| | 1034 | $2,049 | 13-oct-01 | 17-oct-01 |
| | 1035 | $965 | | 17-oct-01 |
| | 1036 | $22,805 | 13-oct-01 | 17-oct-01 |
| | 1037 | $14,160 | | 19-oct-01 |
| | 1038 | $11,002 | 13-oct-01 | 22-oct-01 |
| | 1039 | $8,710 | | 22-oct-01 |
| | 1040 | $508 | | 22-oct-01 |
| | 1041 | $18,930 | 13-oct-01 | 23-oct-01 |
| | 1042 | $5,100 | | 24-oct-01 |

Fig. 26

VIEW ROLLOVER APPLICATION ▶ — 376

Information About You
Name: John Smith
Address
Street: 123 Any St
City: Charlotte
State: North Carolina
Zip: 28227
Marital Status: Married
Age: 31-35
Country of Citizenship: USA
E-mail Address: jsmith@home.com
Annual Household Income: $100,000 to $150,000

What's Important to You
Investment Options: Stocks, Bonds/Fixed Income
# of changes/trades: 3 per month
FI Characteristics: No-load, Low-fee trading, Access to planner 3 times per month, Hotline, Research Reports, IPO's, Extended Hours Trading, Online Account, Branch Office, 24 Hour Service

Rollover Information
Rollover Amount: $12,500
Former Employer: AnyCompany, Inc.
Former Employer's Address
Street: Suite 300 5 Any Blvd.
City: Charlotte
State: NC
Zip: 28226
401(k) Plan Name: AnyPlan
Plan Administrator's Name: Judy Planner
Plan Administrator's Address
Street: 12 Plan Rd
City: Wilmington
State: Delaware
Zip: 02134

Beneficiary Information
1st Beneficiary Name: Jane Smith
Birth Date: 06-09-1961
Address
Street: 123 Any St.
City: Charlotte
State: North Carolina
Zip: 28227
Relationship: Wife
Type: Primary
Share Percentage: 100%

Additional Info
SS #: 555-55-5555
Birth Date: 01-21-1958

ACCOUNT MANAGEMENT SYSTEMS AND METHODS

BACKGROUND OF THE INVENTION

The present invention relates to account management systems and methods and, more particularly, to account rollover systems and methods.

There has been a phenomenal growth trend in the retirement savings industry. This growth trend is primarily due to the shift in the nature of retirement savings, which began with the advent of the 401(k) plan and introduction of Investment Retirement Accounts ("IRAs") in the early 1980s, and continues with the desire of workers to control their retirement destiny. Today, nearly 80% of eligible employees in the United States participate in their companies' 401(k) plans, and over 30% of United States households own IRAs. An employee departing a company is typically faced with the question how to manage his or her employer sponsored retirement savings account. Although, there are a number of ways for handling this situation, the best solution is typically to rollover the account to an IRA because IRAs provide greater flexibility in how a consumer may manage their retirement investment.

Job mobility and retirement trends are spurring an increase in the number of consumers looking to roll over assets, such as from an employer-sponsored 401(k) plan. The increase is predicted to grow the industry to the trillions of dollars mark in the near future. The needs of this industry and the needs caused by its growth are not being sufficiently met by known technology. Typically, financial institutions offering rollover solutions do not have access to a stream of consumers who are seeking rollover solutions and do not have access to an environment that allows them to differentiate their products and services from those of their competitors. Also, consumers typically find such decisions difficult, in part due to the lack of information and difficulty of finding information regarding possible options in a single location. Moreover, existing systems supporting this industry includes pervasive inefficiencies that significantly hamper the processing of asset and data transfer between financial institutions, increasing the time and costs associated with establishing new IRA accounts. One stumbling block that is often experienced by financial institutions is that a consumer cannot directly interact with a single entity to complete a rollover because transfer of custody of the assets to the rollover account typically requires interaction with the employer who sponsored the consumer's retirement saving account and may require interaction with the financial institution who is the current custodian of the retirement savings account.

Techniques for transacting business between consumers and financial institutions and between employers and financial institutions have been developed that use the Internet. These techniques, however, do not address the needs of the rollover retirement account industry, such as the need to simplify the rollover process, the need for a competitive environment for rollover transactions, the need to streamline the rollover process, or other related needs.

In addition, even though both the Internet and employer sponsored savings plans have existed for at least over ten years, to date, an adequate solution for the needs of the retirement saving industry has not been realized.

SUMMARY OF THE INVENTION

In accordance with the principles of the present invention, methods and systems may be provided for a rollover marketplace and for rollover marketplace related features. A rollover marketplace may be implemented in which a consumer interface is provided for consumers seeking a rollover. The consumer interface may provide consumers with an opportunity to receive offers for rollover transactions from financial institutions offering such services. Upon request, each particular consumer may be presented with offers from the financial institutions. A predefined number of offers may be presented. If desired, the offers may be presented on a competitive basis so that consumers are presented with the best available offer. A rollover marketplace may provide a transaction node that is, for example, specifically for allowing consumers to rollover their 401(k) investments (or other employer sponsored retirement accounts) into an Investment Retirement Account managed by a financial institution. Other rollover activity may also be contemplated.

A consumer may specify certain criteria that suits his or her rollover interests. Financial institutions may specify criteria for filtering which consumers will be presented with their offer(s). Financial institutions may have more than one offer available in the marketplace and may associate a different filter with each offer. Consumer selected criteria and/or financial institution selected criteria (e.g., filters) may be used to identify which rollover offers should be presented to each particular consumer. An asset retention approach may also be implemented in which consumers are steered towards particular plans or particular financial institutions.

A rollover marketplace environment may be provided through the use of software equipment and/or hardware equipment such a wide area network (e.g., the Internet), local area networks (e.g., company intranets), consumer interface equipment (e.g., personal computers, personal digital assistants, etc.), and other equipment (e.g., other equipment discussed in connection with FIG. 1).

Rollover management services using rollover management equipment may also be provided. For example, an alerting technique may be provided to allow financial institutions to quickly respond to new rollover accounts. A consumer may be requested to enter application information once the consumer selects one of the rollover offers. The information that is entered by the consumer may be automatically stored and an identifier may be associated with that stored information. An alert (e.g., an e-mail or other web-based applications) may be sent to a financial institution whose offer was selected. The alert may be sent when a provider of the rollover marketplace receives the identifier associated with the stored information. The information associated with the identifier may also be made available to the financial institution. The financial institution may be given the opportunity to assign the new customer to one of their agents for further processing for contacting the customer to follow up on the matter and to print the actual application. An alert regarding a new customer may be sent when financial institution assigns the customer to an agent.

Hardware, software, or combinations thereof may be used to provide rollover service (or management) equipment that implements rollover services, features, and related tasks.

Further summary information is provided below within the Detailed Description section.

BRIEF DESCRIPTION OF THE DRAWINGS

Further features of the invention, its nature and various advantages will be more apparent from the following detailed description, taken in conjunction with the accompanying drawings in which like reference characters refer to like parts throughout, and in which:

FIG. 8 is a diagram of an illustrative introductory page in accordance with one embodiment of the present invention;

FIG. 9 is a diagram of an illustrative consumer information page in accordance with one embodiment of the present invention;

FIG. 10 is a diagram of an illustrative rollover details page in accordance with one embodiment of the present invention;

FIG. 11 is a diagram of an illustrative consumer criteria page in accordance with one embodiment of the present invention;

FIG. 12B is a diagram of an illustrative offer page in accordance with one embodiment of the present invention;

FIGS. 12C–12E are diagrams of an illustrative offer page that includes offer information for a single plan in accordance with one embodiment of the present invention;

FIG. 13B is a diagram of an illustrative additional information page in accordance with one embodiment of the present invention;

FIG. 14A is a diagram of an illustrative completion page in accordance with one embodiment of the present invention;

FIGS. 14B–14E are diagrams of an application in accordance with one embodiment of the present invention;

FIG. 15 is a diagram of an illustrative setup page in accordance with one embodiment of the present invention;

FIG. 16 is a diagram of an illustrative corporate setup page in accordance with one embodiment of the present invention;

FIGS. 18–20 are diagrams of an illustrative filter page in accordance with one embodiment of the present invention;

FIG. 22 is a diagram of an illustrative consumer criteria page in accordance with one embodiment of the present invention;

FIG. 24 is a diagram of an illustrative rollover report page in accordance with one embodiment of the present invention;

FIG. 26 is a diagram of an illustrative rollover report page in accordance with one embodiment of the present invention;

FIG. 27 is a diagram of an illustrative application summary page in accordance with one embodiment of the present invention.

DETAILED DESCRIPTION OF PREFERRED EMBODIMENTS

It has now been discovered that an electronic rollover marketplace may be implemented to support rollover transactions. Consumers may access the marketplace to proceed with steps for completing a rollover transaction. Financial Institutions may compete for consumers in the marketplace. The marketplace may automate and streamline portions of the rollover process for both consumers and financial institutions. If desired, techniques may be implemented to provide end-to-end solutions for consumers and financial institutions to avoid existing obstacles to the process.

In another aspect, rollover software is implemented on enterprise software platforms (e.g., software servicing the business needs of a business typically over a local area network of the business) where the marketplace feature is a component of the overall rollover service offering (e.g., end-to-end rollover transactions).

Figure 1:
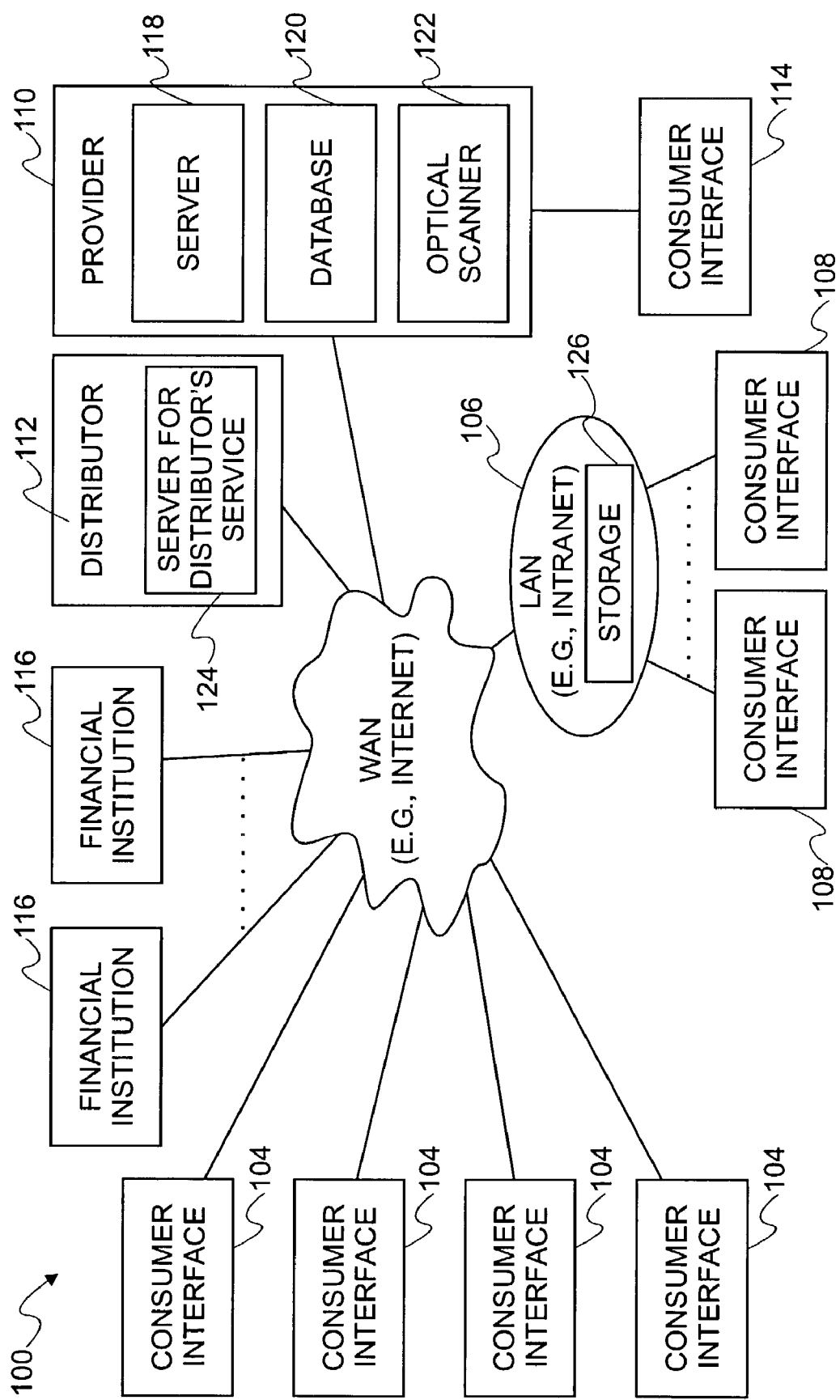
FIG. 1 is a functional block diagram of illustrative systems for providing rollover marketplace features in accordance with one embodiment of the present invention.

With reference now to FIG. 1, an environment such as environment 100 may be used by consumers and financial institutions for their rollover activity. Environment 100 may include wide area network ("WAN") 102 (e.g., the Internet), WAN consumer interfaces 104, local area network ("LAN") 106 (e.g., an intranet), LAN consumer interfaces 108, provider equipment 110, distributor equipment 112, direct consumer interface 114, and financial institution equipment 116. Environment 100 may be configured in other ways. If desired, there may be fewer or greater number of components (e.g., equipment or consumer interfaces) in environment 100. Environment 100 may include software applications implemented in environment 100 to support rollover activity.

Provider equipment 110 may be central to rollover processing activity. If desired, a distributed architecture may be used. Provider equipment 110 may include equipment such as network server 118, database 120, and if desired, optical scanner 122. Database 120 may be part of network server 118. A rollover application or applications may be implemented on network server 118 to provide rollover services. Database 120 may store information related to consumers and financial institutions that are involved in rollover activity.

Distributor equipment 112 may provide the operator of provider equipment 110 with a resource for driving their business volume. Distributor equipment 112 may be implemented by a distributor to provide particular services that appear to offer an opportunity to cross-market rollover services to their consumers (e.g., outplacement services). Distributor equipment 112 may include server 124 that is configured to support the services offered by the distributor. A rollover application(s) or related information may be implemented on server 112 to provide access to the rollover services.

Consumers may interact with rollover services via WAN consumer interfaces 104, LAN consumer interfaces 108, direct consumer interface 114, or other suitable interface equipment (e.g., a telephone portal). WAN consumer interfaces 104 may include personal computers, personal digital assistants, minicomputers, or other computer equipment that has a suitable communications connection with WAN 102. LAN 106 may include a local area network that implements local communications, for example, for a company office or for a number of sites in a company. LAN 106 may be implemented using LAN standards such as Ethernet, Token Ring, FDDI, or other suitable LAN techniques. LAN 106 may include storage 126 that may store information regarding personnel who use LAN 106 (e.g., company employees) and may also store application(s) for implementing rollover services. LAN 106 may have a link to WAN 102 for establishing communications with WAN 102. LAN consumer interfaces 108 may be personal computers, personal digital assistances, minicomputers, or other computer equipment capable of communicating with LAN 106 and/or with WAN 102 through LAN 106.

Direct consumer interface 114 may be a communications interface that allows consumers direct access to the rollover services. The communications link between direct consumer interface 114 and provider equipment 110 may be a dedicated link when the link is established. Direct consumer interface 114 may include a personal computer or other computer equipment.

Financial institution equipment 116 may provide an interface for financial institutions to interact with provider equipment 110. If desired, financial institution equipment 116 may allow financial institutions to interact with consumers via WAN 102.

Communications links within environment 100 may be wireless links, wired links, or combinations thereof. Suitable links may be used for the communications links in environment 100 to allow sufficient data throughput and interaction between end-users (e.g., a consumers, a rollover service provider, a rollover service distributor, a financial institution, etc.). Techniques for implementing such communications links are known to those skilled in the art.

Environment 100 may provide a variety of rollover services to consumers and financial institutions. For example, environment 100 may provide a rollover marketplace to consumers and financial institutions in which financial institutions compete for rollover transactions, in which financial institutions can differentiate their services from their competitors, differentiate multiple proprietary products from one another, or in which financial institutions can target consumers, etc. A rollover marketplace may be provided at least in part based on the process illustratively shown in FIG. 2

Figure 2:
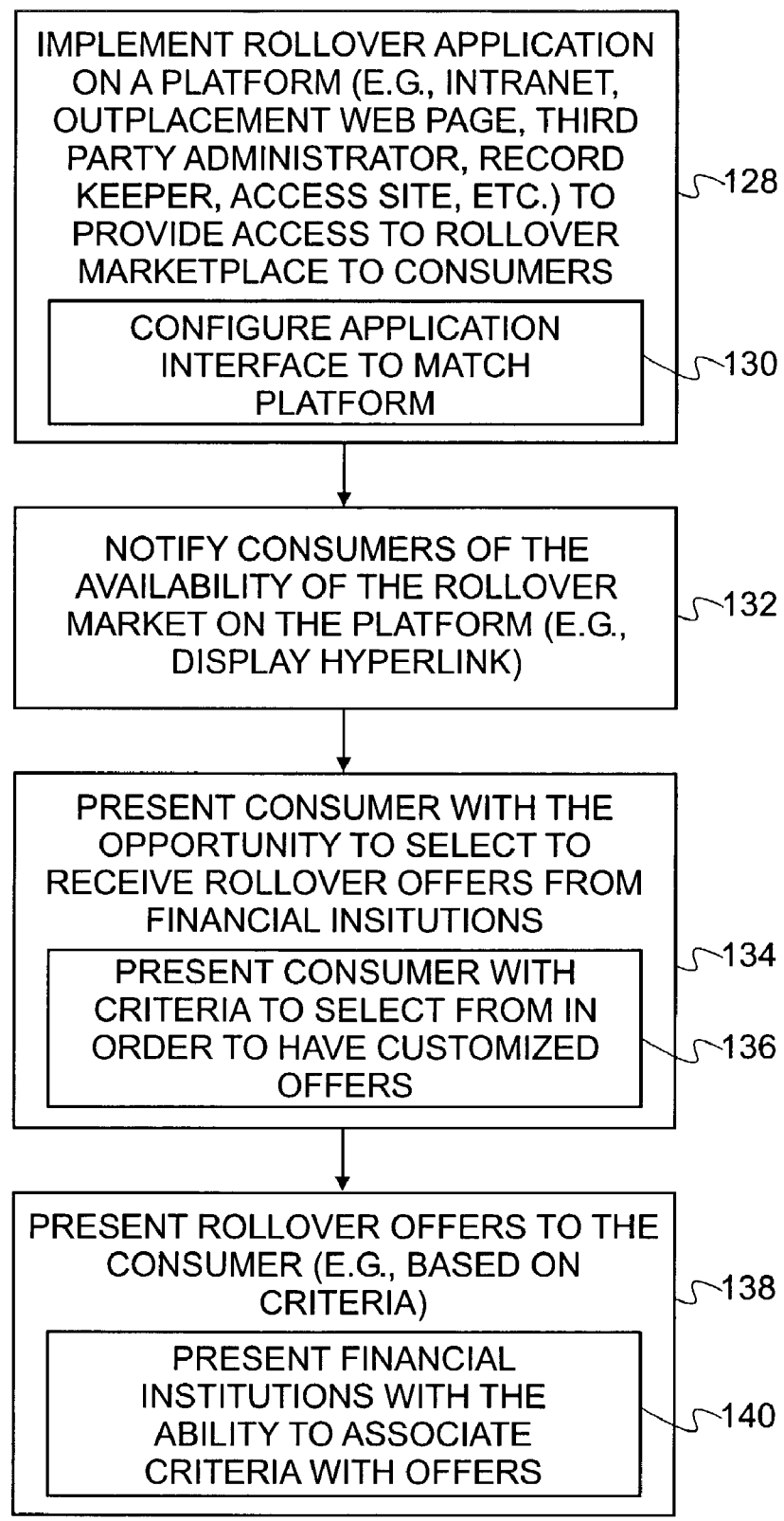
FIG. 2 is a flow chart of illustrative steps involved in presenting rollover offers to consumers in accordance with one embodiment of the present invention.

With reference now to FIG. 2, at step 128, a rollover application or applications may be implemented on a platform to provide access to a rollover marketplace to consumers. A platform may include hardware or software, individually or in combination. A platform may be local area network 106 of FIG. 1, provider equipment 110 of FIG. 1, distributor equipment 112 of FIG. 1, software running on LAN 106, or other suitable hardware and/or software equipment. If desired, software applications or related information may be implemented on consumer interfaces to provide access to a rollover marketplace to consumers. Rollover services may be provided through a company intranet, an outplacement Internet web site, an employment classified Internet web site, a company's enterprise software, a third party administrator, a record keeper, an access site, etc.

If desired, step 128 may include step 130. At step 130, the rollover application may be configured to match a consumer interface for the rollover application with "look-and-feel" of a resource (e.g., company Intranet, outplacement Internet web site, employment classified Internet web site, etc.) through which the rollover application is accessed. This matching will allow rollover services to be seamless presented when consumers are accessing rollover services through a distributor or a company intranet.

At step 132, consumers may be notified of the availability of the rollover marketplace. For example, a hyperlink for the rollover service may presented to a user. Such a notification may be presented when a consumer is involved in activity on a consumer interface that is related to the rollover of retirement accounts or may be automatically presented to a consumer when there is information indicating that the consumer is in a position to transact a rollover. Consumers may be also be informed of the rollover services through a wide variety of media sources (e.g., magazines, television, newspapers, brochures, etc.) so that consumers may obtain information from media sources on how to access rollover services.

Other sources of such information may be provided through a third party administrator of a benefits plan or through a record keeper for a benefits plan. Businesses who offer retirement accounts, such as 401k accounts, to their employees may arrange to have a third party administrator administer their plan. Third party administrators may arrange to have a record keeper company perform the record handling and/or administration of the benefit plans. Typically, a single third party administrator is used by a business to administer their retirement plan. In such cases, the third party administer is often a financial institution or is associated with a financial institution. The third party administer (or record keeper) may also have penetration into the employee environments of businesses which they service, for example, through a company's intranet. Such features are often provided to give the employees ease of access to the information in their retirement accounts and to simplify the process for moving account contents between different mutual funds that are available in the retirement program. The third party administrator or record keeper may provide a link in electronic pages that are presented to their customers for guiding the customers to a rollover service. If desired, the third party administrator or record keeper may be a host, agent, provider, or distributor for the rollover service.

Once a consumer accesses the rollover service, the consumer may be presented with the opportunity to receive rollover offers from financial institutions at step 134. If desired, step 134 may include step 136. At step 136, a consumer may be presented with criteria that the consumer may select from in order to receive offers that better match that consumer's interests. Examples of such criteria are further discussed below.

At step 138, the consumer may be presented with rollover offers. The rollover offers may have been selected for presentation to the consumer based on that consumer's criteria. A limited number of offers may be presented to the consumer. Step 138 may involve step 140. At step 140, financial institutions may be presented with the ability to associate desired criteria with different offers. For example, a financial institution may associate different offers with what different types of consumers by associating groups of criteria with each offer. This allows financial institutions to better target their different services by filtering consumers for whom those services are not intended. The criteria selected by a consumer may be matched with the criteria selected by a financial institution to identify which offers best match the interests of the consumer and the financial institutions. The winning offers may be presented to the consumer. The system may be configured to present only up to a defined number of winning offers to a consumer. Random selection techniques may be used as a secondary tool for identifying winning offers to be presented to a consumer. Other techniques may involve allowing financial institutions to select a set of primary criteria and to select one or more sets of lower priority criteria. This will allow financial institutions greater flexibility in suiting their offers with their intended consumers and will allow better differentiation between offers within the rollover offer process.

Other techniques which focus less on criteria-based targeting may also be used. For example, the rollover service may provide a distribution channel for rollover IRA plans of a financial institution. One example of this involves the situation where a third party administrator, which typically is also a financial institution, or record keeper (which typically has a financial institution as an existing client) is given control over the presentation of offers to steer consumers to rollover accounts offered by the third party administrator or a particular financial institution. Multiple offers from one financial institution may also be presented to, for example, steer a consumer to a particular financial institution. This provides an asset retention program that can be used to prevent the reduction of assets managed by the third party administrator or record keeper. One way of accomplishing the asset retention program is by permitting third party administrator or record keepers to be distributors. Implementing a feature that permits control over which offers are presented may also be useful for other purposes. For example, some financial institutions may seek to increase their exposure to consumers and may pay a higher premium to increase the number of times offers from that financial are actually presented to consumers.

The steps illustratively shown in FIG. 2 may be performed in different combinations or in different sequences as appropriate. The steps may be combined with other processes, steps, or systems illustratively described herein.

Figure 3:
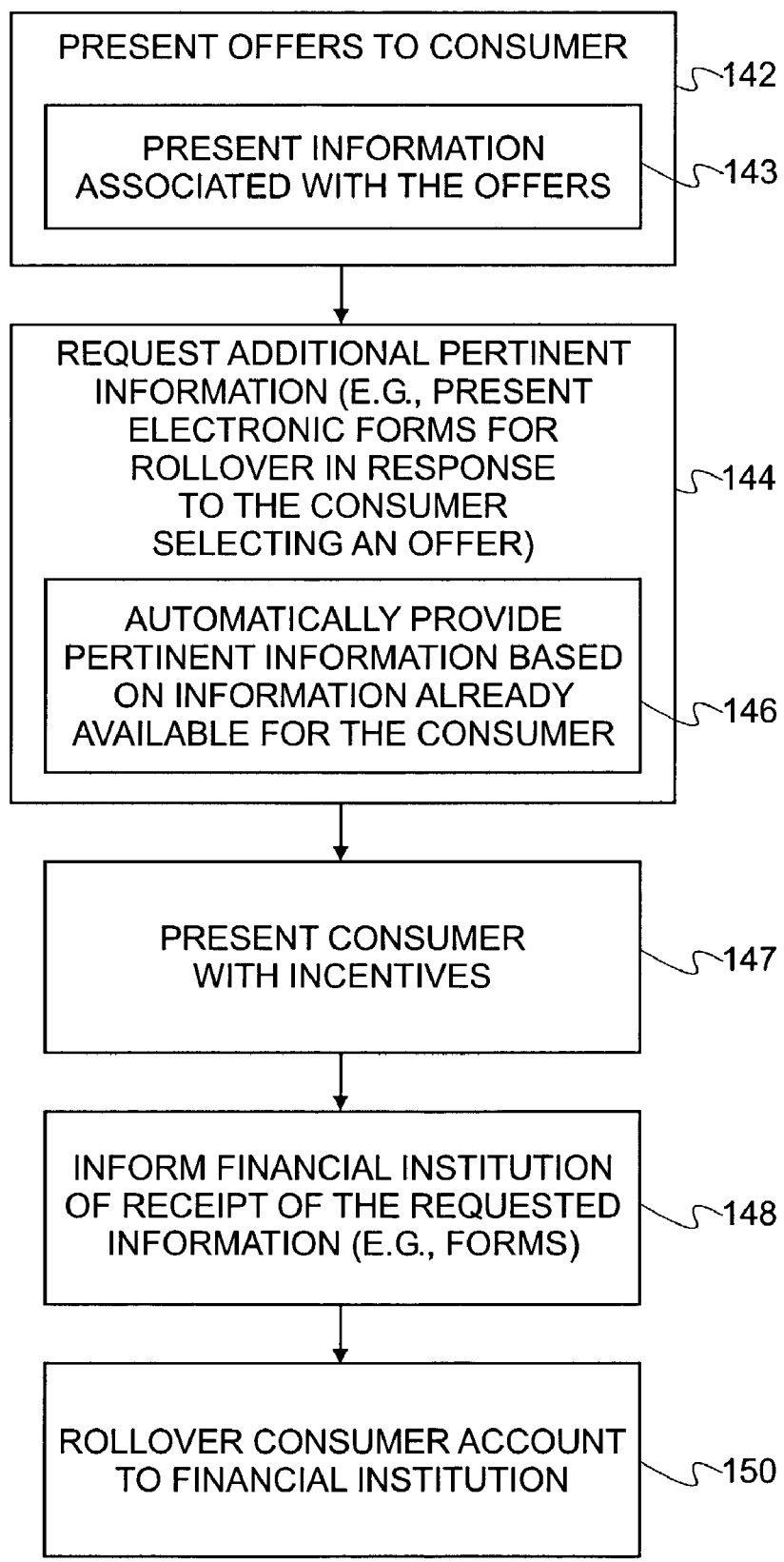
FIG. 3 is a flow chart of illustrative steps involved in implementing a rollover based on a particular offer in accordance with one embodiment of the present invention.

Illustrative steps involved in completing a rollover transaction are shown in FIG. 3. With reference now to FIG. 3, at step 142, a consumer may be presented with a number of offers (e.g., winning offers that were identified for presentation based on criteria selected by the consumer and/or financial institutions). Information that is related to the offers (e.g., information associate with each offer) may be presented to the consumer with the offers at step 143, which may be included as part of step 142. This information may present the consumer with specifics about each offer, with incentives for accepting a particular offer, with information on services that will be included as part of the offer, with service bundles that the financial institution will provide for their offer, or other suitable information that will allow the consumer an the financial institutions to differentiate the services of the financial institutions.

Once a consumer selects one of the presented offers, additional information pertinent to the rollover process may be requested from the consumer at step 144. For example, electronic forms (e.g., an electronic rollover IRA application form of a particular financial institution) may be displayed to the consumer in response to the consumer selecting one of the presented offers. In a corporate intranet environment, a consumer may be presented with a custodian transfer form that will authorize the transfer of custody of the consumer's assets to their intended rollover recipient. This form may also be presented to consumers in other suitable environments also.

Step 144 may include step 146. At step 146, pertinent information may be automatically obtained (e.g., entries in the forms are automatically completed) when that information is already available in the current environment. For example, information that a consumer may have already entered while interacting with the rollover service, information available on the consumer from a corporate intranet, or other information resources may be used to further automate the process for the consumer.

When the consumer has completed the requested information (e.g., the electronic forms), the consumer may continue the process by printing, signing, and mailing the information to the rollover marketplace provider. Other ways by which the consumer may continue the process may involve accepting the information in the forms (e.g., through an electronic signature, through encryption, etc.) and sending the information in electronic format for receipt by the rollover marketplace provider. Thus, a rollover marketplace provider may be central to the presentation of offers and the acceptance of offers by consumers. However, other techniques may be also be used such as, to have consumers send their rollover applications to some other intermediary or to the financial institutions.

At step 147, an incentive may be presented to a consumer to promote the completion of the process by the consumer. An incentive may be presented when a consumer is viewing offer information or may be presented once the consumer has selected an offer or completed an online application for a selected offer. The incentive may provide some form of reward (e.g., free trades, cash, free financial services, etc.) to entice the consumer to continue the process or to send the application within a certain time frame. An incentive may be presented as part of a page such as an offer page or may be sent to a consumer (e.g., using e-mail or other mode of communications) when that consumer has provided sufficient information for such activity. An advantage of this technique is that it will quicken the rate at which completed applications are received.

At step 148, financial institutions may be informed of the receipt of the requested information (e.g., completed forms). At step 150, the rollover of the consumer's account may be effected in response to the receipt of the requested information (e.g., receipt of completed and signed forms).

The steps illustratively shown in FIG. 3 may be performed in different combinations or in different sequences as appropriate. The steps may be combined with other processes, steps, or systems illustratively described herein.

Figure 4:
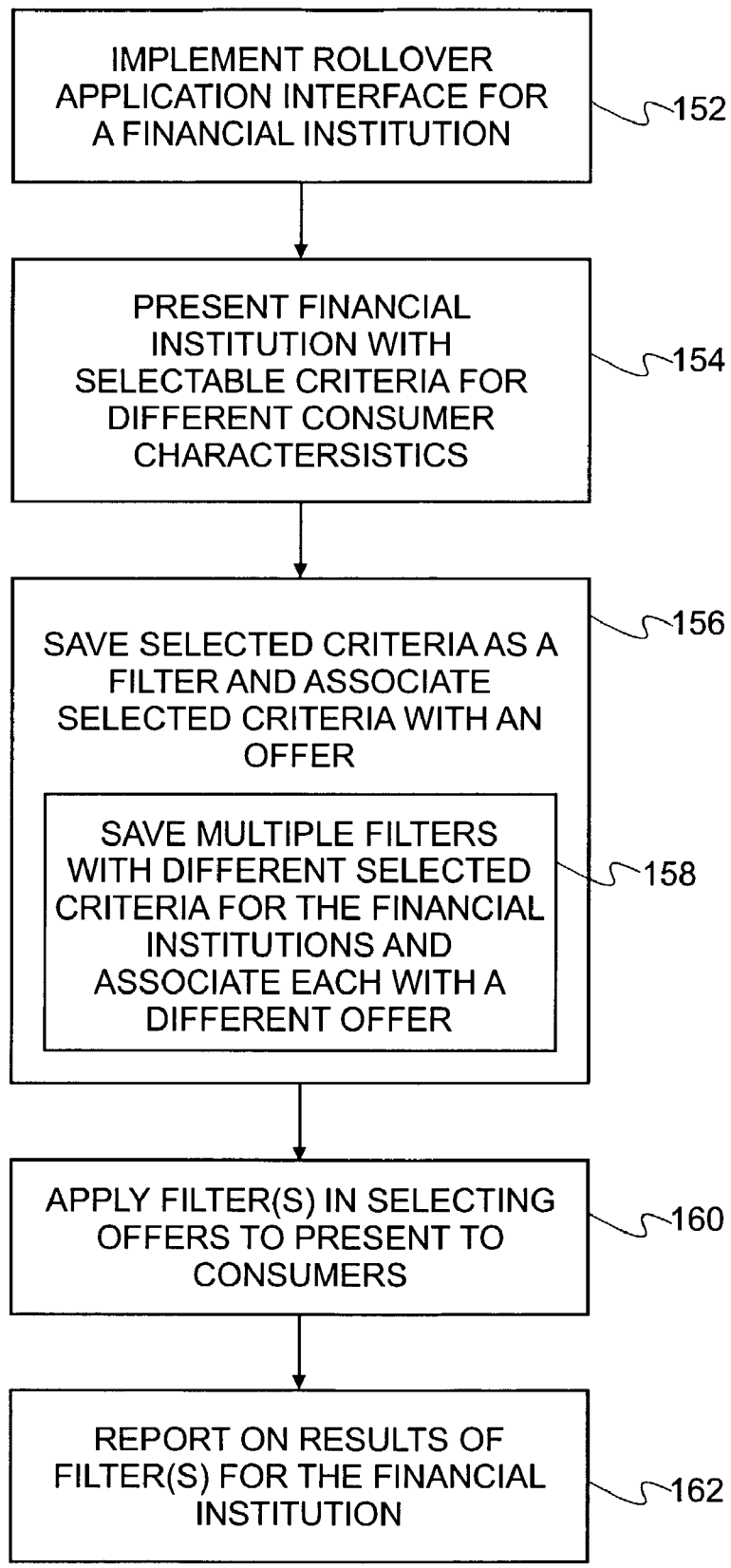
FIG. 4 is a flow chart of illustrative steps involved in using filters to match plan participants with offers in accordance with one embodiment of the present invention.

As mentioned above, financial institutions may associate desired rollover criteria with their offers to better tune the offers to their intended consumers. Illustrative steps involved in providing such services are shown in FIG. 4. With reference now to FIG. 4, at step 152, a rollover application interface may be implemented for a financial institution. The implementation may involve implementing software applications or information on the software and/or hardware equipment of the financial institution or may simply involve presenting information to the financial institution through existing applications (such as a browser application, e-mails applications, etc.). The implementation will result in giving the financial institution access to rollover marketplace features. At step 154, the financial institution may be presented with different consumer related criteria to select from. The consumer related criteria may be criteria such as consumer demographics (e.g., age, sex, geographic location, marital status, etc.), rollover amount, or other consumer related criteria. As mentioned above, the financial institution may assign different criteria to have different levels of importance.

At step 156, the financial institution may be given the opportunity to save a selected set of criteria as a filter to be applied within the rollover marketplace. At step 156, the financial institution may be permitted to associate the filter with one or more rollover offers of the financial institution. Step 156 may also include step 158 that may allow the financial institution to save multiple filters and to associate filters with different offers.

At step 160, the filter(s) may be applied to information related to the consumers on the rollover marketplace to identify which offers among the offers on the rollover marketplace best match consumer related information (e.g., consumer selected criteria, consumer demographics, etc.). As mentioned above, offers may be presented to a consumer based on the application of the filters. At step 162, the effectiveness of a financial institution's offers may be presented to the financial institution. The report may provide the financial institution with information about their existing filters, associated offers, the number of times each offer was presented to consumers, the number of times offers that were presented to consumers were selected by a consumer, or other related information.

The steps illustratively shown in FIG. 4 may be performed in different combinations or in different sequences as appropriate. The steps may be combined with other processes, steps, or systems illustratively described herein.

Figure 5:
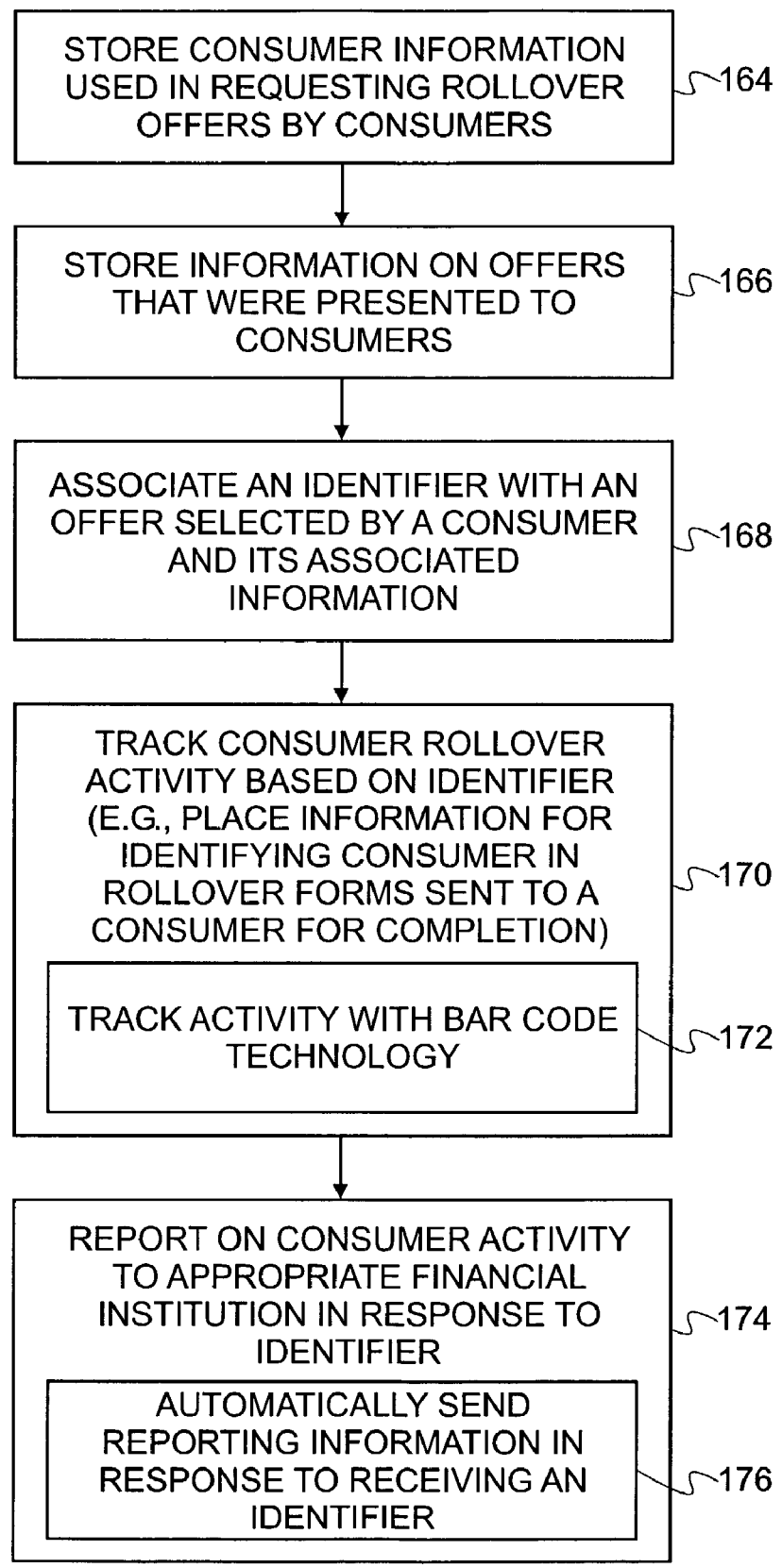
FIG. 5 is a flow chart of illustrative steps involved in reporting rollover transaction activity in accordance with one embodiment of the present invention.

Illustrative steps in tracking consumer rollover activity are shown in FIG. 5. With reference now to FIG. 5, at step 164, information used in requesting rollovers by consumers may be stored. The information may be stored at any suitable location in environment 100 of FIG. 1. For example, information may be stored in a corporate employee database in an intranet, in a database 120 of provider equipment 110 of FIG. 1, stored locally on a consumer interface, etc. The information may be automatically stored in response to information that a consumer manually enters into their consumer interface (e.g., in response to information requests).

At step 166, information on offers that were presented to consumers may be stored. The information may be stored at any suitable location in environment 100 of FIG. 1. For example, the information may be stored in a database 120 of provider equipment, on financial institution equipment 116, or any other suitable location that makes the information available to the operator of the rollover marketplace and/or to financial institution. At step 168, an identifier may be associated with a particular offer that is presented and selected by a consumer and with its associated information (e.g., offer information, consumer information, etc.). An advantage of the identifier is that it provides quick and convenient tracking of rollover activity. At step 170, consumer rollover activity may be tracked based on the identifier. For example, the identifier or identifier related information may be included as part of the requested information (e.g., forms) that a consumer completes and sends to an operator of the rollover marketplace to continue with the rollover process. Provider equipment 110 may include equipment for automatically reading the identifier when the requested information (e.g., forms) is received from a consumer. For example, the identifier may be a bar code that is included in an IRA form to be read by an optical scanner at step 172 when the form is received by an operator of the rollover marketplace.

At step 174, the operator may report on rollover activity to an appropriate financial institution in response to receiving an identifier. Thus, an operator may send a communication to financial institution that includes information associated with an identifier (e.g., consumer, accepted offer, etc.) when the operator receives requested information (e.g., completed forms) that includes that identifier. Step 174 may include step 176. At step 176, reporting information (e.g., a transaction alert) may be automatically sent to an appropriate financial institution in response to receiving an identifier of an offer (or information from an identifier may be obtained). The information may be automatically sent, for example, in an e-mail, when an optical scanner reads the identifier (e.g., a bar code containing identification information). The reporting information may include information about the information that is associated with that identifier. If desired, this automatic reporting technique may be used immediately upon receiving an identifier from a consumer because the relevant information of the consumer may have been stored and is readily available to be sent to a financial institution when the identifier is received (e.g., the identifier is received with a signature to confirm the transaction). The reporting information will allow the financial institution to act quickly in the rollover process and allow the financial institution to directly contact the consumer.

The steps illustratively shown in FIG. 5 may be performed in different combinations or in different sequences as appropriate. The steps may be combined with other processes, steps, or systems illustratively described herein.

A rollover marketplace may provide an outlet for financial institution to market services. For example, with reference to FIG. 6, an electronic forum (e.g., a rollover marketplace) may be established for financial institutions to transact rollover activity with consumers at step 178. Step 178 may include step 180 and 182. At step 180, the rollover process may offer an end-to-end rollover solution by enabling consumers to complete forms or other supply other information that is needed to change the current custodian of their account (e.g., the custodian of their 401(k) account). This may typically be offered through a company intranet of an employer who has sponsored the retirement plan account of consumers who are leaving that company. The "transfer of custodian form" is one that is typically only available through an employer. This form, in combination with an IRA application, allows the rollover of a 401(k) to an IRA account.

At step 182, the forum may match consumers with financial institutions. Such features were discussed above in connection with FIG. 2 and FIG. 3. At step 184, financial institutions that are given access to use the forum may be charged an initiation fee. At step 186, financial institutions may be charged for specific forum related activity in which they are involved. For example, a financial institution may be charged a fee when an offer by that financial institution is presented to a consumer, and/or when a financial institution views information on a consumer to whom an offer from that financial institution was presented. At step 188, a financial institution may be charged a fee when a rollover initiated through the forum is completed. This process may save financial institutions the substantial cost and effort involved in individually marketing and selling their rollover services. Other fee structures may also be used.

Figure 6:
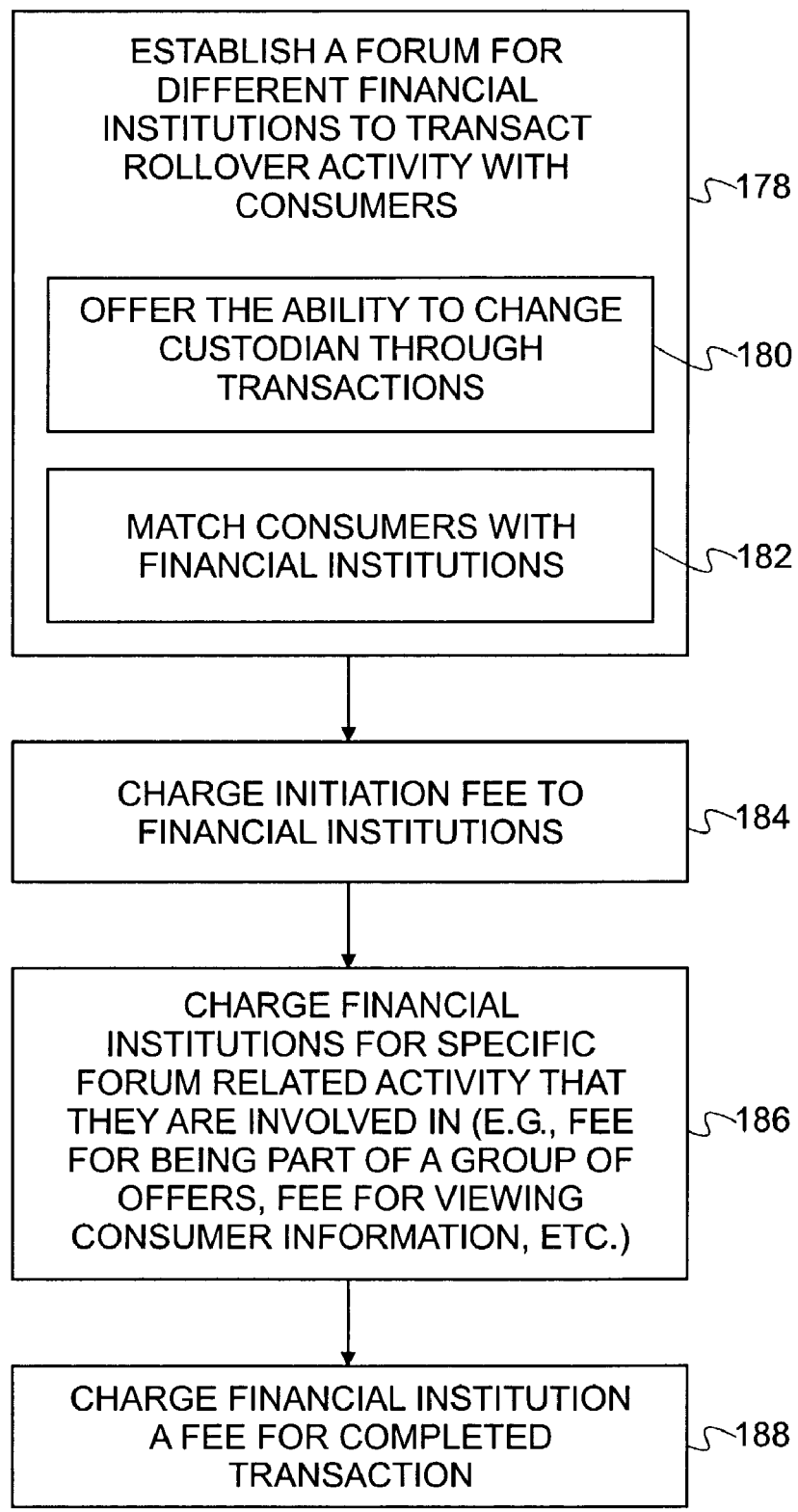
FIG. 6 is a flow chart of illustrative steps involved in business transactions between financial institution and a rollover marketplace provider in accordance with one embodiment of the present invention.

The steps illustratively shown in FIG. 6 may be performed in different combinations or in different sequences as appropriate. The steps may be combined with other processes, steps, or systems illustratively described herein.

Some of the disadvantages in known account management systems are the inability of the system to allow financial institutions to promptly access information about their new customers and the inability of the system to allow financial institutions to promptly contact their new customers. A technique that alerts financial institutions of new customers may be used in the rollover marketplace environment. Illustrative steps in such techniques are shown in FIG. 7.

Figure 7:
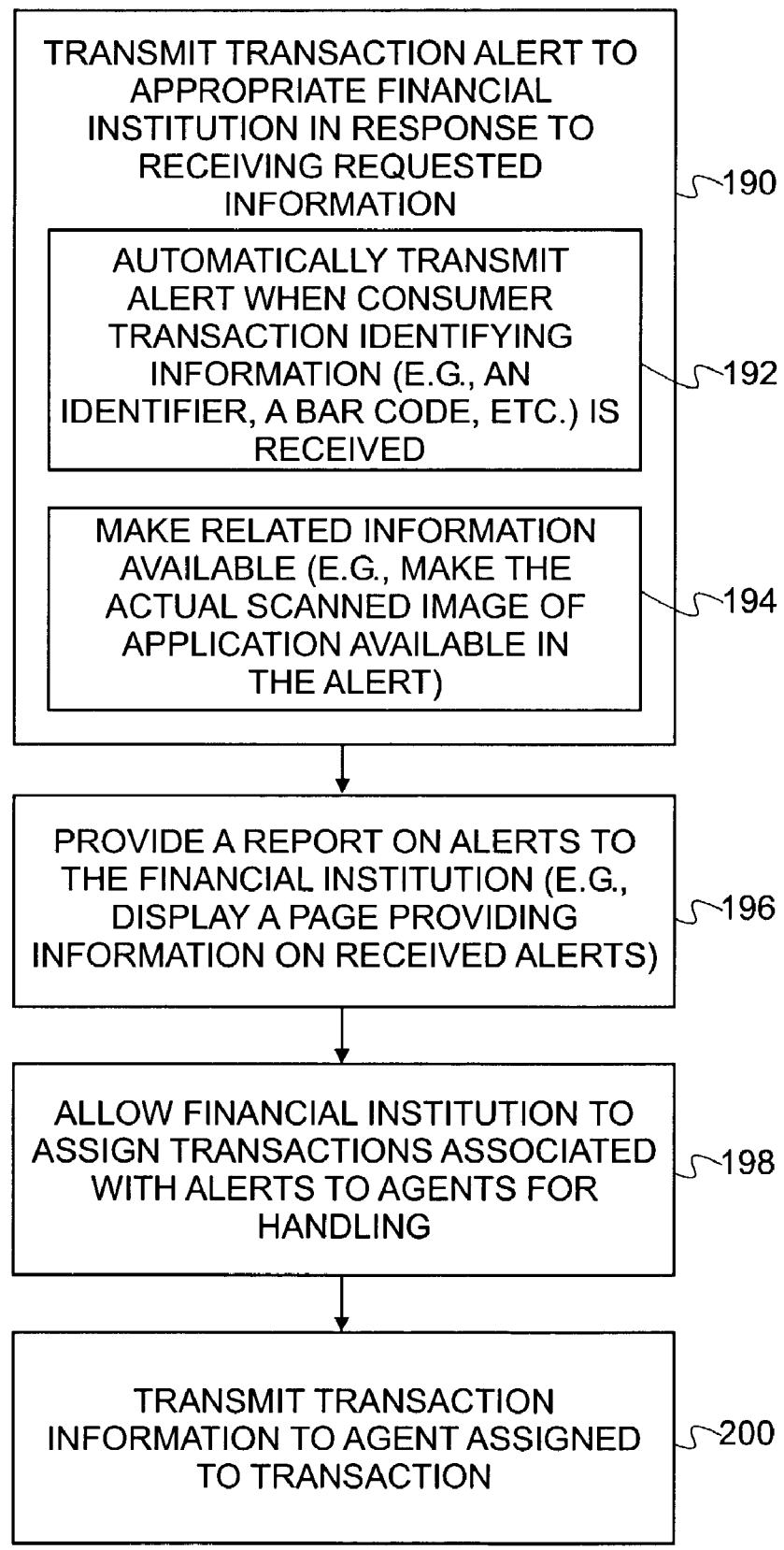
FIG. 7 is a flow chart of illustrative steps involved in alerting financial institutions and their agents or brokers of new transactions in accordance with one embodiment of the present invention.

With reference now to FIG. 7, at step 190, a transaction alert may be transmitted to an appropriate financial institution in response to the receipt of requested consumer rollover information (e.g., receipt of completed forms). The transaction alert may be transmitted by the rollover marketplace to a financial institution when the rollover marketplace receives forms or other documents indicating that a consumers desire to rollover an account (e.g., rollover an account based on an offer presented to that consumer). Thus, the provider of the rollover marketplace (or another suitable participant) may transmit a transaction alert to a financial institution to alert the financial institution of the new customer account.

Step 190 may include steps 192 and 194. At step 192, the alert may be automatically transmitted when consumer-transaction-identifying information (e.g., an identifier, a bar code, etc.) is received with information requested for a rollover. The alert may be automatically sent to the appropriate recipient when the identifying information is automatically read and a financial institution (e.g., a designated e-mail recipient for the financial institution) is identified based on the identifying information. At step 194, transaction related information (e.g., the actual scanned image of the application) may be made available to the recipient (e.g., transmitted in the e-mail, made available through a web page, FTP access is provided, etc.). Using electronic communications and processing to handle the application should substantially reduce the response time of financial institutions to incoming applications. Information such as customer name, contact information, rollover amount, or other suitable transaction related information may be made available to the recipient of the alert by including such information in the alert or by making the information available through some other technique in connection with the receipt of an alert.

At step 196, a report may be provided to a financial institution to communicate to the financial institution a record of alerts that have been sent to the financial institution. The report may include information related to the alerts (e.g., date and time information, rollover amount, consumer name, etc.). Financial institutions may be presented with the option to assign transactions to desired agents in response to receiving an alert. Thus, at step 198, a financial institution may be allowed to assign a transaction associated with a received alert to an agent for their handling. For example, a financial institution may be presented with an option to assign an alert or assign a transaction related to an alert and to identify the assignee when the financial institution receives an alert or is presented with a new alert in a report.

At step 200, information related to a transaction may be transmitted to an assigned agent to alert the agent of the assignment. The information may be transmitted in response to a financial institution assigning an alert or related transaction. The information may include sufficient specifics to allow the assigned agent to start the rollover process or to contact the consumer.

The steps illustratively shown in FIG. 7 may be performed in different combinations or in different sequences as appropriate. The steps may be combined with other processes, steps, or systems illustratively described herein.

With reference now to FIG. 8, a consumer may be presented with introductory page 202 via a consumer interface (e.g., consumer interfaces 104, 108, or 114 of FIG. 1). For example, introductory page 202 may be presented to a consumer via an intranet of a company using that company's enterprise platform or may be presented to a consumer when the consumer selects to access a particular web site on the Internet. Thus, a consumer who is leaving a particular company may be given access a marketplace for rollover transactions via the company's intranet. A page can be customized according to the needs of individual electronic human resources partners or needs of employers. As mentioned above, other communications routes may also be used. Introductory page 202 may provide introductory information, links to related information or related interactive pages, and options 204 for beginning the rollover process.

In response to selecting option 204, consumer questionnaire page 206 of FIG. 9 may be presented to a consumer. With reference now to FIG. 9, questionnaire page 206 may include profile information area 208, login information area 210, and rollover information area 212. Questionnaire page 206 may also include next page option 214 and save option 216.

Profile information area 208 may include data entry sections requesting profile information such as name, address, marital status, age, citizenship, and annual income. Other profile information may also be requested. Login information area 210 may include data entry sections for allowing the consumer to specify their login identification (e.g., their e-mail address) and login password. Rollover information area 212 may include specific data entry sections for requesting information about the number of accounts to rollover and if more than one account is involved, requesting whether the accounts are to be pooled. A consumer may also enter a promotional code with which her or she may obtain certain benefits.

Save option 216 may be a save and stop option that permits the consumer to save the information that they have entered and to return to the rollover process at a later time (e.g., by logging into the system using their login identification and password). Next page option 214 may allow the consumer to continue with the rollover process. In environments in which a database containing information about that consumer is already available (e.g., in a corporate intranet in which a user currently logged in), some of the information may be automatically entered into page 206 without requiring user action. In addition, a consumer may be prevented from continuing the rollover process when some of the information on page 206 is incomplete.

With reference now to FIG. 10, rollover details page 218 may be displayed in response to next page option 214 of FIG. 9 being selected. Rollover details page 218 may include rollover details area 222 to request that the user enter information specifying a name for this rollover and for specifying the amount that the user intends to rollover. Rollover details page 218 may include next page option 224 and save option 216. Rollover details page 218 may also include previous page option 219 that returns the user to the previous page (e.g., page 206 of FIG. 9) when previous page option 219 is selected. Rollover details area 222 may include a data entry area adapted to receive account number information for one or more accounts that will be involved in the rollover. Rollover details page 218 may include beneficiary area 223 with which beneficiary information may be entered. Beneficiary information may include beneficiary name, social security number, and percentage share of benefits. Beneficiary information for the current user may be requested at another point in the rollover process such as after a particular rollover offer is accepted.

With reference now to FIG. 11, consumer criteria page 220 may be presented to the user in response to the user selecting next page option 224 of FIG. 10. Consumer criteria page 220 may include criteria area 226 to request that the user enter his or her interests or desired terms for the rollover transaction. In criteria area 226, a user may, for example, specify the type of investment (mutual funds, stocks, bond/fixed income, CD, etc.) that they are most likely to use for the recipient rollover account (e.g., a rollover IRA account) and specify the number of changes or trades (e.g., per month or per year) that the user made in the past to the account or plan (e.g., their 401(K)) that is the subject of the rollover. Consumer criteria page 220 may include an area in which a user indicates the level of risk that best describes their investment philosophy (e.g., conservative, conservative/Moderate, moderate, moderate/aggressive, aggressive, etc.).

Other information that may be requested to be specified may include information on criteria that is important to the user when considering which financial institution is to manage the rollover account. For example, the consumer may specify information regarding account/management fee criteria (e.g., whether the user is interested in "no load" (no fee) mutual fund transactions, whether the user is interested in low-fee stock trading, etc.), specify information regarding receiving financial planning advice (e.g., specify how many times a year or month the user would like to have access to a financial planner, etc.), information regarding investment research and expertise (e.g., whether free access to stock and/or bond research reports is desired, etc.), specify information regarding specialized products and services (e.g., whether access to initial public offerings or extended hours trading is desired, etc.), specify information on services or convenience (e.g., whether access to a secure online account for making changes or trades is desired, whether access to a branch office of the financial institution is desired, whether access to a 24 hour customer service telephone line is desired, etc.). If desired, user entry of such information may be optional.

Consumer criteria page 220 may include pervious page option 219 and save option 216. Consumer criteria page 216 may include submit option 228 with which the consumer can submit his or her information for processing. The information may be submitted, for example, to provider equipment 110 (e.g., server 118) of FIG. 1 or to another suitable site that is configured to handle rollover transactions and has access to a database of information on financial institutions and their current rollover offers (e.g., database 120 of FIG. 1). Information submitted by the user may be stored at provider equipment 110 (e.g., database 120), stored at some accessible intermediate point, or in a combination thereof. The information may be processed to identify current offers from financial institutions to present to the user. The offers may be identified based on consumer criteria entered by the user and/or based on criteria selected by financial institutions in connection with their offers. If desired, other criteria may also be used.

Figure 12A:
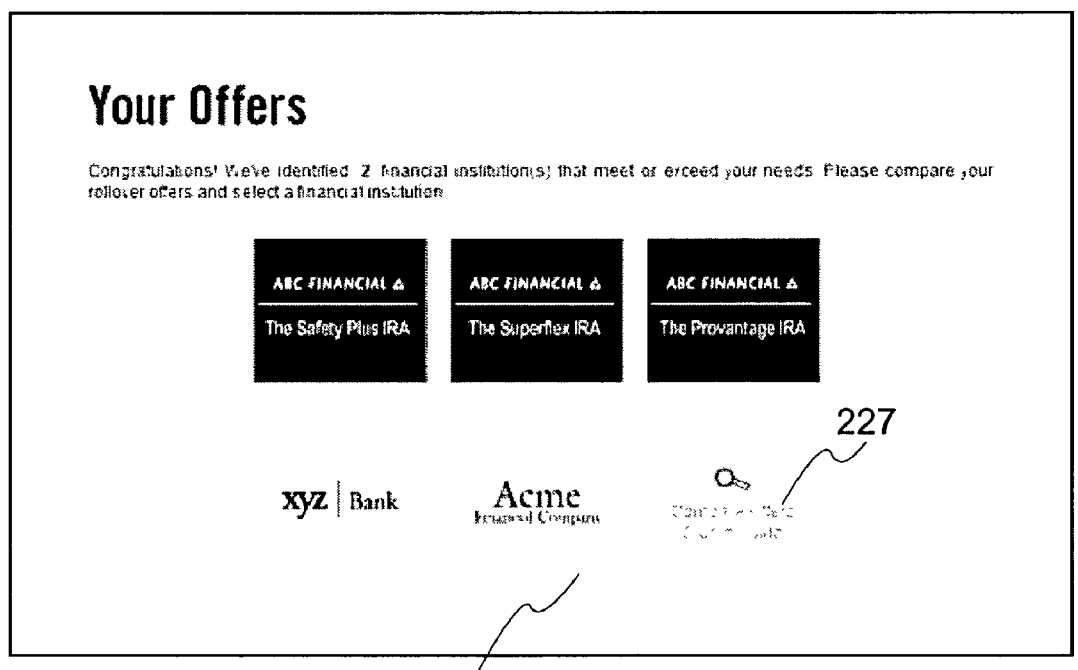
FIG. 12A is a diagram of an illustrative initial offer page in accordance with one embodiment of the present invention.

With reference now to FIG. 12A, initial offer page 229 may be presented to a user in response to the user submitting their information to the rollover marketplace (e.g., by selecting submit option 228 of FIG. 11). Initial offer page 229 may include rollover offer links 231 that are associated with offers for the current user. Rollover offer links 231 have information displayed in association with them for identifying the offering financial institution and/or financial service. This will allow a consumer to simply select an offer based on their interest in a particular financial institution or service. Initial offer page 229 may present up to a predefined number of rollover offer links 231 (e.g., five links) to the user. Links 231 may have been selected for presentation identifying offers and associated criteria that best match a consumer criteria. Since a limited number of offers are being presented, random selection techniques may be used to break ties between offers. Random selection may be used to select five offers to present from a group of ten offers that each matched the consumer criteria of a particular user equally well. If desired, other techniques may also be used. Initial offer page 229 may include compare offers option 227. A user may select compare offers options 227 to have information regarding offers presented in a way that the user can compare the details of the offers.

With reference now to FIG. 12B, offer page 230 may be presented to a user in response to the user submitting their information to the rollover marketplace (e.g., by selecting submit option 228 of FIG. 11) or if desired, when the user selects compare offers option 227 of FIG. 12A. If desired, offer page 230 may be presented to the user immediately after the user selects to submit their information or after a short pause information to allow for processing and communications. Offer page 230 may present up to a predefined number of offers (e.g., five offers) to the user. Offers and their associated criteria that best match consumer criteria may be presented to a user. Since a limited number of offers are being presented, random selection techniques may be used to break ties between offers. For example, in an offer page that presently shows only five offers, random selection may be used to select five offers to present from a group of ten offers that each matched the consumer criteria of a particular user equally well. If desired, other techniques may also be used.

Offer page 230 may present information (e.g., in a matrix format) on offers. As shown, matrix 236 may include row 232 identifying the financial institutions from which offers are being presented. Matrix 236 may include rows specifying particular information for each offer. For example, matrix 236 may include rows for providing a link to where a consumer can go for more information, for identifying the rollover amount, for information on the cost of the annual fee for the recipient rollover account, for information on identifying how many free trades a user may have per year, for information on identifying whether online advice and tools are available with an offer, for information on identifying whether stock or bond research report will be available with an offer, for information on identifying whether access to initial public offerings will be provided with an offer, for information on identifying whether access to a financial advisor will be provided with an offer, for information on whether access to an online account will be provided with an offer, for information on whether access to an institutional branch office will be provided with the offer, for information on whether extended hour trading will be provided with an offer, for information on whether any special features are included with the offer, etc. Matrix 236 may include row 234 that includes a select option for each offer to allow the user to select an offer comparing the different offers side-by-side and deciding which offer best suits their needs.

An offer page for a single offer is illustratively shown in FIGS. 12C–12E. The single offer page may be displayed when a user selects one of rollover offer links 231 of FIG. 12A. FIGS. 12C–12E present detailed information regarding the offer from a financial institution or service (e.g., the financial institution or service selected using rollover offer links 231 of FIG. 12A). The offer page shown in FIGS. 12C–12E may include an option to allow the user to select the offer.

The portion of the single page offer shown in FIG. 12E includes incentive section 241. As mentioned above, incentives may be presented to consumers to promote the selection of a rollover offer. Incentive section 241 may present the consumer with a reward of obtaining three free trades if that consumer applies now for the current offer shown in FIGS. 12C–E. Other incentive techniques and rewards may be implemented. For example, an e-mail or other correspondence may be sent to a consumer to encourage that consumer to complete the process such as by selecting an offer or by completing and mailing an application within a certain number of days. Rewards may for example, include cash, free trades, subscriptions, etc.

Figure 13A:
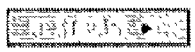
FIG. 13A is a diagram of an illustrative plan sponsor page in accordance with one embodiment of the present invention.

With reference now to FIG. 13A, plan sponsor page 243 may be displayed for a user to have the user enter plan sponsor information for the user's accounts (e.g., 401k accounts) involved in the rollover. Plan sponsor page 243 may be displayed when a user selects a particular offer or at another suitable time. Plan sponsor page 243 may be configured for entry of information on one or more plan sponsors such their names, telephone numbers, addresses, etc.

With reference now to FIG. 13B, additional information page 238 may be displayed when a particular financial institution requires additional information from a consumer that has selected an offer from that particular financial institution. Additional information page 238 may include logo 240 that is a logo for the financial institution that provided the selected offer.

Figure 14B:
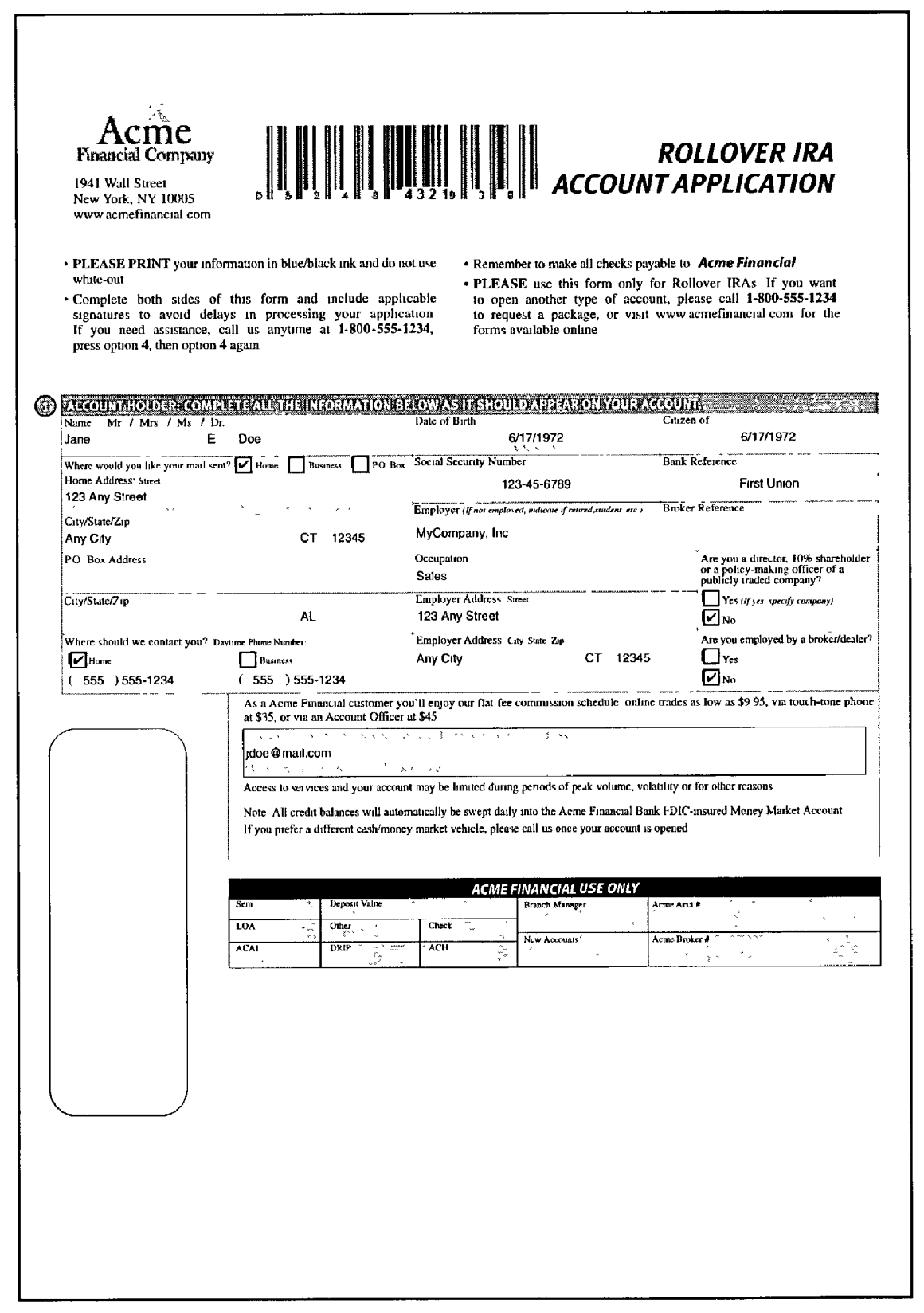
Figure 14E:

Once a user has completed the requested information, completion page 244 of FIG. 14A may be displayed. Completion page 246 may include information instructing the user on how to complete the application process. Completion page 244 may include information on how to print the requested information (e.g., the forms of the financial institution) on a printer that is available to the user's computer equipment. Completion page 244 may instruct the user to sign the printout from the printer and to mail the signed document to a particular address. If desired, an option may be provided that permits the user to electronically submit his or her application (e.g., using an electronic signature). The requested information (e.g., the forms) may be sent to the provider of the rollover marketplace, to an agent of the provider, to the winning financial institution, etc. Sending the information to the provider or its agents allows better tracking of rollover activity by the provider. When the winning financial institution receives the requested information (e.g., the forms), a rollover account (e.g., a rollover IRA account) may be opened for the applicant.

FIGS. 14B–14E show an illustrative rollover application. The rollover application may include an account application, a direct rollover authorization form, and if desired other suitable forms. The application may be the application of a financial institution (e.g., a financial institution associated with a selected offer). The application may be displayed to the user in scanned image form (e.g., PDF form). The application page 238 may be presented to the user in response to the user following the print instructions in completion page 244 of FIG. 14A. The application may include a logo of the financial institution. The application may also include a bar code (as shown) that is associated with rollover process. The bar code may be scanned upon receipt of the form at a processing center such as server 110 to automatically associate the received documents with information that was entered by the user during the rollover offer and application process. As further discussed below, automatic notifications may be sent in response to the receipt of the bar code.

Information that is available on the consumer who is applying for the account may be automatically entered into the application. For example, information that the user entered in questionnaire page 206 of FIG. 9 may be automatically entered into the application (e.g., entered into "Account Holders" section of the application as shown). The application may include several document pages that may each have been automatically completed based on information available to the system. Thus, once printed, the user simply signs and sends the documents. The financial institution receives the benefit of the use of their own "paper" applications for the process if desired.

A number of different financial institutions may take part in the rollover marketplace. With reference now to FIG. 15, setup page 150 may include list 152 of financial institutions that have signed up to take part in rollover transactions. List 252 may include address and contact information for the financial institutions and may include an option for editing information stored for each particular financial institution (e.g., edit their designated manager). Setup page 250 may include option 254 for adding a new financial institution to the system. Setup page 250 may be a page that is accessible by authorized personnel of the provider of the rollover marketplace (e.g., personnel at provider equipment 220 of FIG. 1).

Corporate setup page 256 of FIG. 16 may be presented in response to a user selecting add new financial institution option 254. With reference now to FIG. 16, corporate setup page 256 may include logo area 258, company description area 260, disclosure area 262, and save option 2464. Logo area 258 may be used to identify a file that contains a logo that is to be used for a financial institution. In company description area 260, a description of the financial institution may be entered. The description may be presented to marketplace users. Disclosure area 262 may include an area in which company disclosure may be entered for presentation to marketplace users. Save changes option 264 may be selected to save information entered into corporate setup page 256. Access to corporate setup page 256 may be limited to specified personnel of the financial institution for which page 256 was displayed and/or to authorized personnel of the provider (or its agents).

Figure 17:
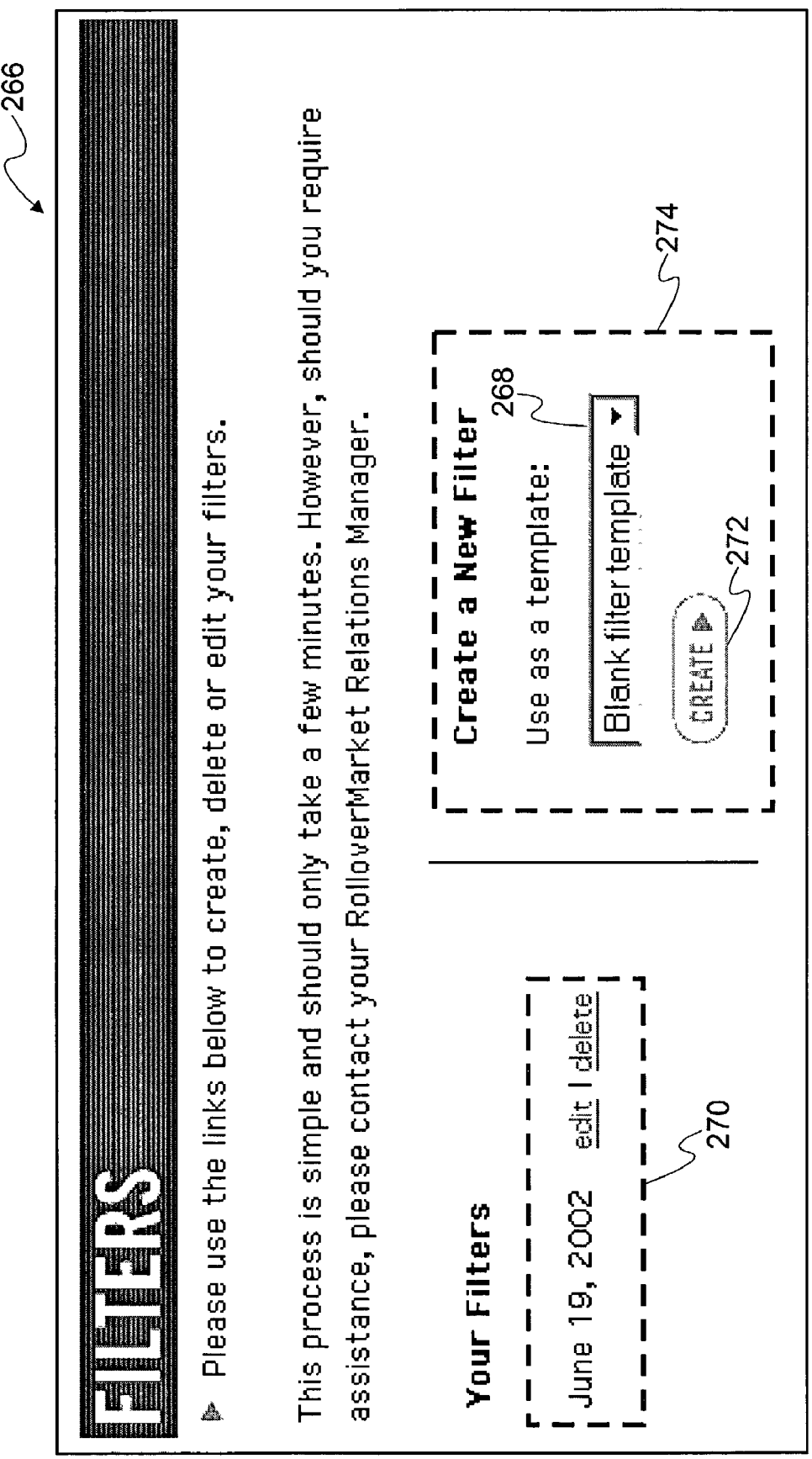
FIG. 17 is a diagram of an illustrative filter menu page in accordance with one embodiment of the present invention.

As mentioned above, financial institutions may specify filters that are to be used in matching their rollover transaction offers with rollover customers. With reference now to FIG. 17, filter menu page 266 may be presented to create or access filters for a financial institution. Filter menu page 266 may include new filter area 274 and existing filter area 270. New filter area 274 may include option 268 and 272 that can be selected to create a new filter. Option 268 may provide the option of selecting a filter template for the new filter. Option 272 may be selected to create a filter based on a selected template. Existing filter area 270 may provide access to filters that have already been created. Existing filter area 270 may include a name of a filter and options for editing or deleting a filter.

With reference now to FIG. 18, filter page 276 may be displayed when a user selects to create, view, or edit a filter. Filter page 276, as shown, does not indicate that any user selections have been made. However, for editing and viewing a filter, filter page 276 will include earlier saved user selections. Login identifier 280 may be included in this page or on other pages that require user login. Login identifier 280 indicates who is currently logged in to the system (e.g., using a login ID and a password). Change password option 282 may be included in filter page 276 or on other appropriate pages to allow the current user to change their password. Area 278 may identify the current date and/or time. Log out option 284 may be included in filter page 276 or in other accessed pages when a user is currently logged in to the system. Log out option 284 may be selected to logout of the system. Logo 286 may be included in filter page 276 and may include a logo of the financial institution who is currently using the system. A logo for the provider of the rollover marketplace may also be shown in filter page 276.

Filter page 276 may include filter name area 288 that can be used to enter a filter name for the particular filter setting that will be selected. Primary filter area 292 may present selectable criteria that can be used as a primary filter for matching consumer (e.g., retirement plan participant seeking to rollover their retirement accounts) with offers. Primary filter area 292 may include criteria that a financial institution may identify for the eligibility of consumers. Primary filter area 292 may include rollover amount criteria 294, state of residence criteria 296, zip code of residence criteria 298, age criteria 300, and annual household income criteria 302. If desired, other criteria or other combinations of criteria may be included as part of primary filter area 292.

Rollover amount criteria 292 may permit a financial institution to identify rollover amount filter criteria to filter consumers based on a maximum, minimum, or range for the amount of a rollover. State of residence criteria 296 may permit a financial institution to filter consumers based on their state of residence. Zip code of residence criteria 298 may permit a financial institution to filter consumers based on the zip code of the consumers. Age criteria 300 may permit a financial institution to filter consumers based on their age (e.g., specifics ages, or one more specific age ranges). Annual household income criteria 302 may permit a financial institution to filter consumers based on their annual household income (e.g., based on one or more specific income ranges).

Figure 19B:
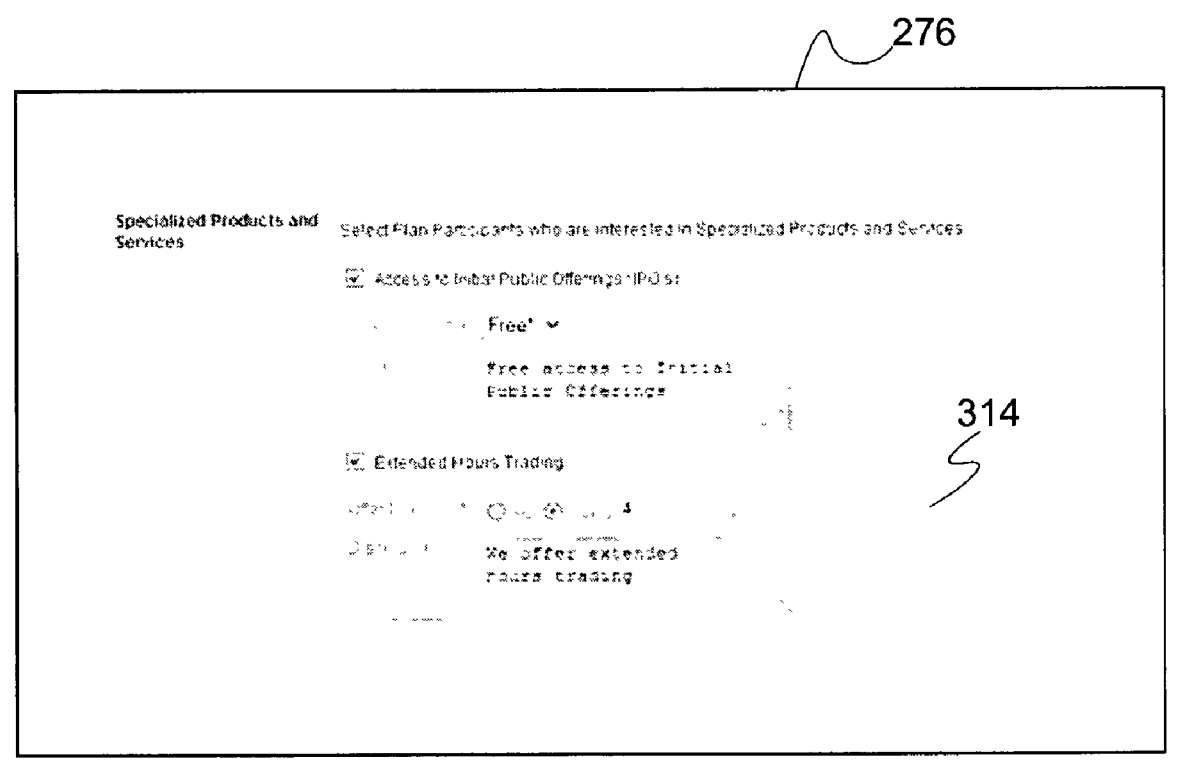

Filter page 276 may include more than one displayable page. FIGS. 19A–20 may include addition content of filter page 276. With reference now to FIGS. 19A–19B, filter page 276 may include secondary filter criteria such as investment criteria 304, trading flexibility criteria 306, risk assessment criteria 307, financial planning/advice criteria 310, investment research and expertise criteria 312, and specialized products and services criteria 314.

Investment criteria 304 may permit a financial institution to specify investment filter criteria based on which consumers are interested in specific investment options (e.g., mutual funds, stocks, bond/fixed income, etc.). Trading flexibility criteria 306 may include options that can configure to filter consumers based on the trading flexibility that consumers desire. For example, a financial institution may specify filtering to be performed based on a maximum or minimum number of trades that are desired over a specified period of time (e.g., a month, a year, etc.). Trading flexibility criteria 306 may also permit the financial institution to associate the trading flexibility that consumers desire with an offer (e.g., a specific number of free trade per) and/or a disclosure for the offer.

Risk assessment criteria 307 may permit a financial institution to select risk assessment criteria. For example, the financial institution may select conservative, conservative/ moderate, moderate, moderate/aggressive, or aggressive. This criteria may be used to distinguish between applicants based on their financial goals. Financial planning/advice criteria 310 may permit a financial institution to select financial planning/advice criteria such as whether or how often account owners will be interested in accessing a financial advisor. In filter page 276, the financial institution may be permitted to associate an offer with the selected criteria (e.g., two free advisor sessions per year) and to associate a disclosure with the offer.

Investment research and expertise criteria 312 may permit a financial institution to specify investment research and expertise criteria such as whether account owners are interested in specials deals for research reports. Filter page 276 may further allow a financial institution to associate an offer and a disclosure for the offer with this criteria.

Specialized products and criteria 314 may permit a financial institution to select specialized products and criteria such as whether account owners are interested in specialized products or services (e.g., access to Initial Public Offerings, access to extended hours trading, etc.). As in the case of some of the other criteria mentioned above, a financial institution may select to associate a particular offer for a specialized product or service (e.g., access to initial public offering, access to extended hours trading, etc.) with the current filter and to associate a disclosure with the offer.

Filter page 276 may further include content shown in FIG. 20. With reference now to FIG. 20, other secondary criteria may include service and convenience criteria 318 such as whether it is important to the customer to have access to a secure online account for trading purposes or for changing their rollover, whether access to a branch of the financial institution is desired, whether access to a 24 hour customer telephone line is desired, etc. The system may permit a financial institution to specify an offer for the different product or services that are mentioned in service and convenience criteria 318 and to associate a disclosure with the offer.

Filter page 276, as shown, permits a financial institution to directly link an offer or parts of an offer with a particular set of filter criteria that the financial institution selects. One of advantage of this technique is that the financial institution is not required to access an additional page to set parameters for an offer and link those parameters to a particular filter. However, if desired, one or more additional pages may be used to implement filters and/or offers.

Filter page 276 may include additional offer-related features that permit a financial institution to specify additional offer page information. For example, filter page 276 may include area 324 to permit a financial institution to specify marketing information (e.g., text information) for the offer. Filter page 276 may include area 326 for specifying a particular annual fee offer (e.g., a particular price per year) and to associate a disclosure in connection with that fee offer. Filter page 276 may include area 328 for specifying whether the current offer will include text with respect to offering online advice, online tools, or both and may permit a financial institution to specify and associate a disclosure with that offer.

Filter page 276 may include save option 330, which may be selected to save the currently selected filter setting, and may include cancel option 332, which may be selected to cancel the currently selected setting and exit page 276.

If desired, other techniques for configuring filters and/or offers may be used. In addition, the information and/or setting discussed above in connection with page 276 are not intended to be exhaustive. If desired, other types of criteria, information, or features may be included in page 276.

Figure 21:
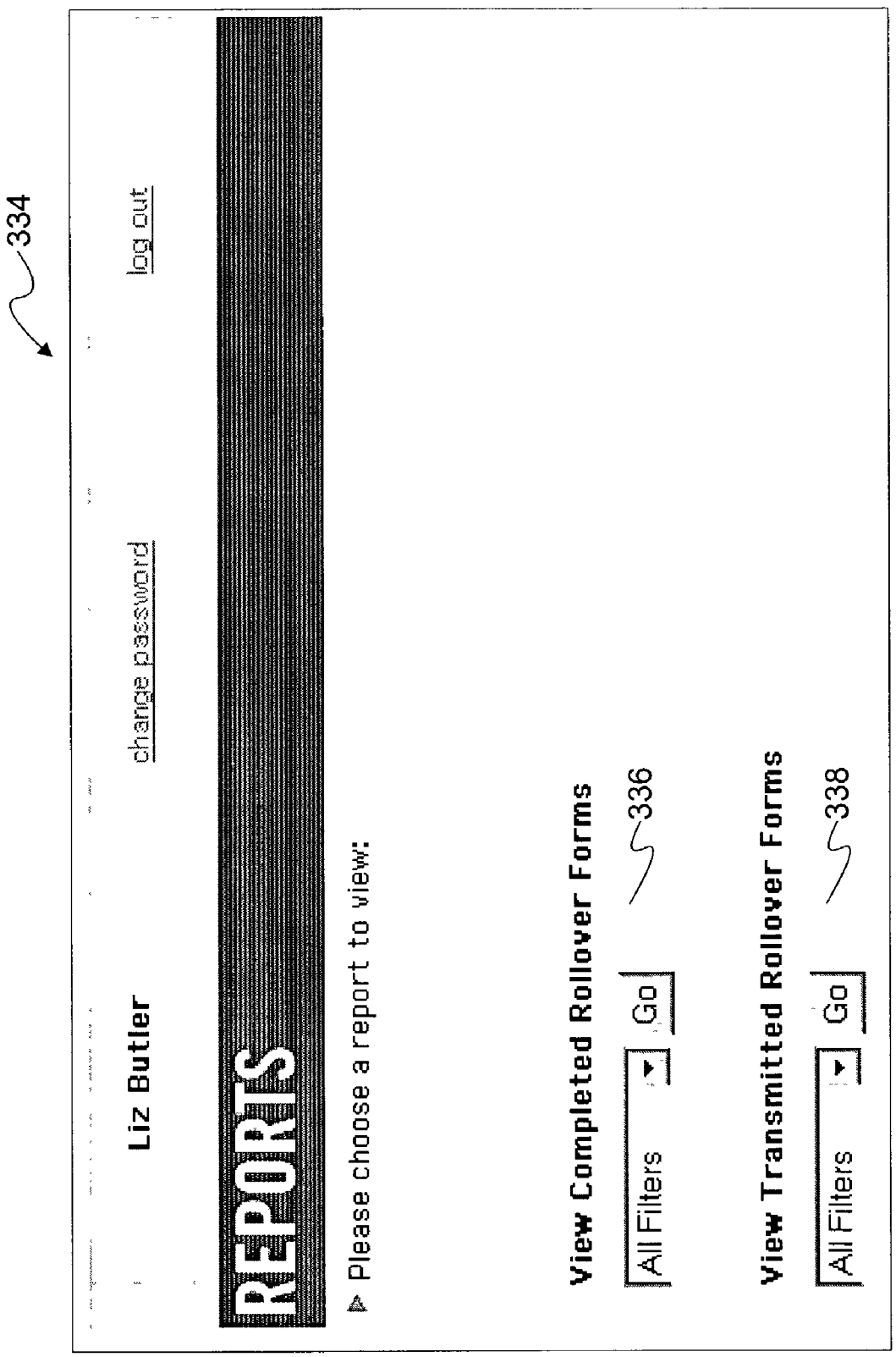
FIG. 21 is a diagram of an illustrative report page in accordance with one embodiment of the present invention.

A provider of a rollover marketplace environment may view rollover information based on filter information. For example, with reference now to FIG. 21, report page 334 may be displayed to present to a provider options for viewing rollover forms based on filter information. Report page 334 may include completed forms options 336, which will permit a provider to select to view a report on completed rollover forms (e.g., forms that have been completed and received by the provider) based on all filters or based on one or more specific filters. Report page 34 may also include transmitted forms option 338, which will permit a provider to select to view a report on transmitted forms (e.g., forms that have been transmitted to be completed) based on all filters or based on one or more specific filters.

A provider may drive rollover transaction activity and/or related revenue by establishing relationships with distributors. Distributors may host their own rollover marketplace environment, may user the rollover marketplace environment established by the provider, or may provide a rollover marketplace environment using a combination of the two. Distributors may, for example, be companies who are already operating in a related business and may have financial institutions as existing clients of their business. One advantage that may be offered to such distributors is that the distributor may limit available offers to offers that are available from financial institutions that are their existing clients. With reference now to FIG. 22, distributor setup page 340 may be displayed to a provider to permit the provider to view information on existing distributors 342 and/or to add, edit, or delete distributors. Distributor setup page 340 may include add distributor option 346, which will permit a provider to specify a new distributor when that option is selected.

The response time of financial institutions is typically an import aspect with respect to the expectation of individuals who have requested rollovers and with respect to the opportunity for financial institutions to close a deal. An alert system (e.g., illustrative process of FIG. 7) may be implemented to quicken the response of time financial institutions.

Figure 23:
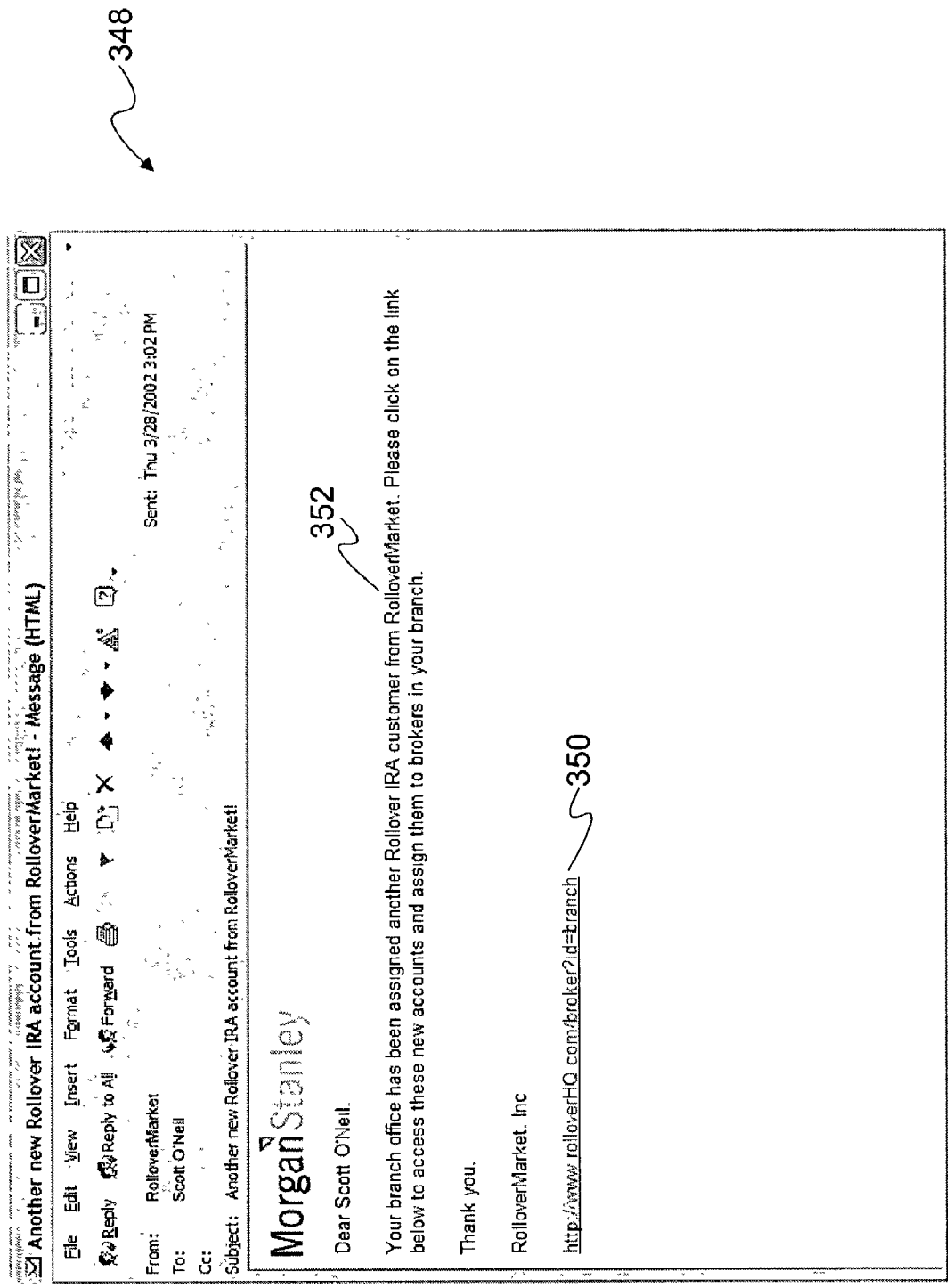
FIG. 23 is a diagram of an illustrative e-mail notice for a financial institution in accordance with one embodiment of the present invention.

For example with reference now to FIG. 23, a notice such as e-mail 348 may be sent (e.g., automatically sent) to a designated e-mail address for a financial institution to notify the financial institution that a customer has accepted their offer (e.g., completed rollover forms for an offer by that financial institution is received by a provider, distributor, or other intermediary). E-mail 348 may include link 350 which may be selected to access information for that financial institution. E-mail 348 may also include information 353 which may be rollover information and instructions.

With reference now to FIG. 24, rollover report page 354 may be displayed for a particular financial institution to view information on applications that have been received in response to offers made available by that financial institution. Rollover report page 354 may be displayed when link 350 of FIG. 23 is selected. Rollover report page 354 may include list 356 specifying information on rollover applications for that financial institution. List 356 may include information on an identifier for each application, on the rollover amount specified in the application, on the date on which the application was received (e.g., received by the provider via regular mail), on the date on which the provider submitted the application to the financial institution, etc. Assign feature 358 may be included in page 354 to allow a financial institution to assign one of their agents (e.g., a specific one of their brokers to oversee or handle the transaction (e.g., to contact the customer via telephone). A notice (e.g., an e-mail) may be automatically sent to a broker or agent when that broker or agent is assigned an application. List 356 may include the names of agents or brokers who have been assigned transactions. An option may be associated with listings in list 356 to allow the financial institution to view the one or more applications.

Figure 25:
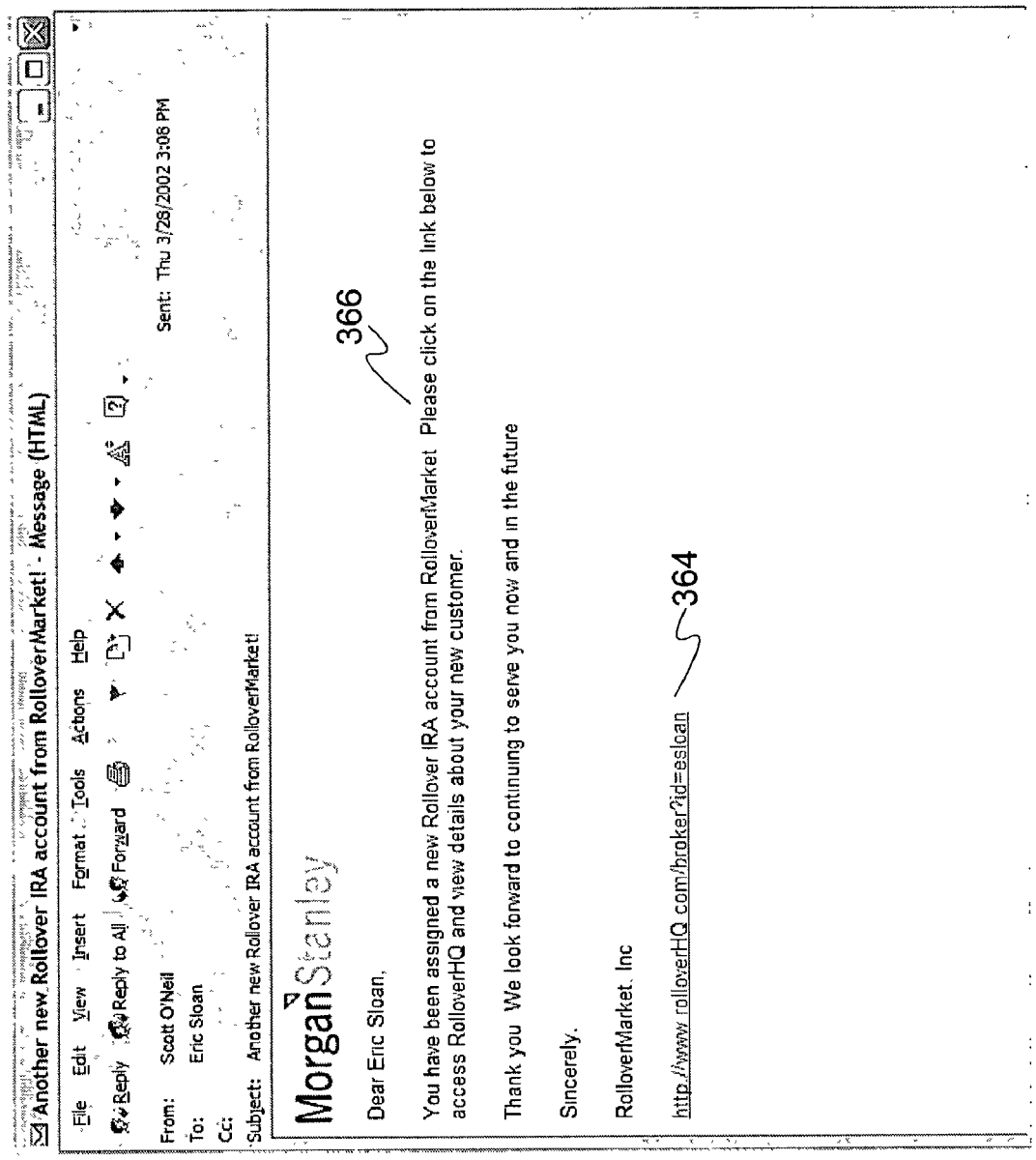
FIG. 25 is a diagram of an illustrative e-mail notice for an agent or broker of a financial institution in accordance with one embodiment of the present invention.

With reference now to FIG. 25, a notice such as e-mail 362 may be sent (e.g., automatically sent) to an agent of a financial institution when the financial institution assigns that agent a rollover application (e.g., when the financial institution uses assign feature 358 of FIG. 24). E-mail 362 may include information 366 for informing an agent of their new application assignment and may include information on how to access information on the new application assignment. E-mail 362 may include link 364 which may be selected to access information on the new application assignment.

With reference now to FIG. 26, rollover report page 368 may be displayed for an agent (e.g., when the agent or broker selects link 364 of FIG. 25). Report page 368 may include report 370 that provides information related to the agent assigned to the rollovers. The information may include an identifier for each application, a rollover amount, application receipt date, application process/submission date, etc. Report page 368 may include information identifying which entries on report 370 are new and may include option 372 for viewing information on a particular application.

With reference now to FIG. 27, application summary page 374 may be presented to display a summary of a particular application. Application summary page 374 may be displayed to an agent of a financial institution when the agent selects to view information on a particular application assigned to that agent (e.g., the agent selects option 372 of FIG. 26). Application summary page 372 may include information on the applicant (e.g., name, address, age, marital status, citizenship, e-mail address, household income, etc.), information on the applicant's rollover criteria (e.g., desired investment option, change/trade preferences, secondary criteria, etc.), information on the rollover (e.g., amount, former employer, type of plan to rollover, plan administrator, etc.), beneficiary information, etc.

Application summary page 374 may include view application option 376, which the current user can select to view information shown in summary page 374 in a different format (e.g., view electronic forms that were completed by the applicant).

A broker or agent who views information in application summary page 374 may gain relevant information regarding the rollover and the rollover applicant and may follow up with the applicant to confirm the transaction or to answer any of the applicant's questions. This information may be provided to an agent of the financial institution shortly after an applicant requested information (e.g., completed application forms) is received by the provider, a distributor, or some other intermediary. As mentioned above, automatically saving rollover marketplace participant information and associating an identifier with a particular transaction that is desired by the participant permits the information to be automatically available to financial institutions and their agents when documents containing the identifier are received (e.g., received electronically, received via mail, etc.) by the provider, a distributor, or an intermediary.

Figure 28:
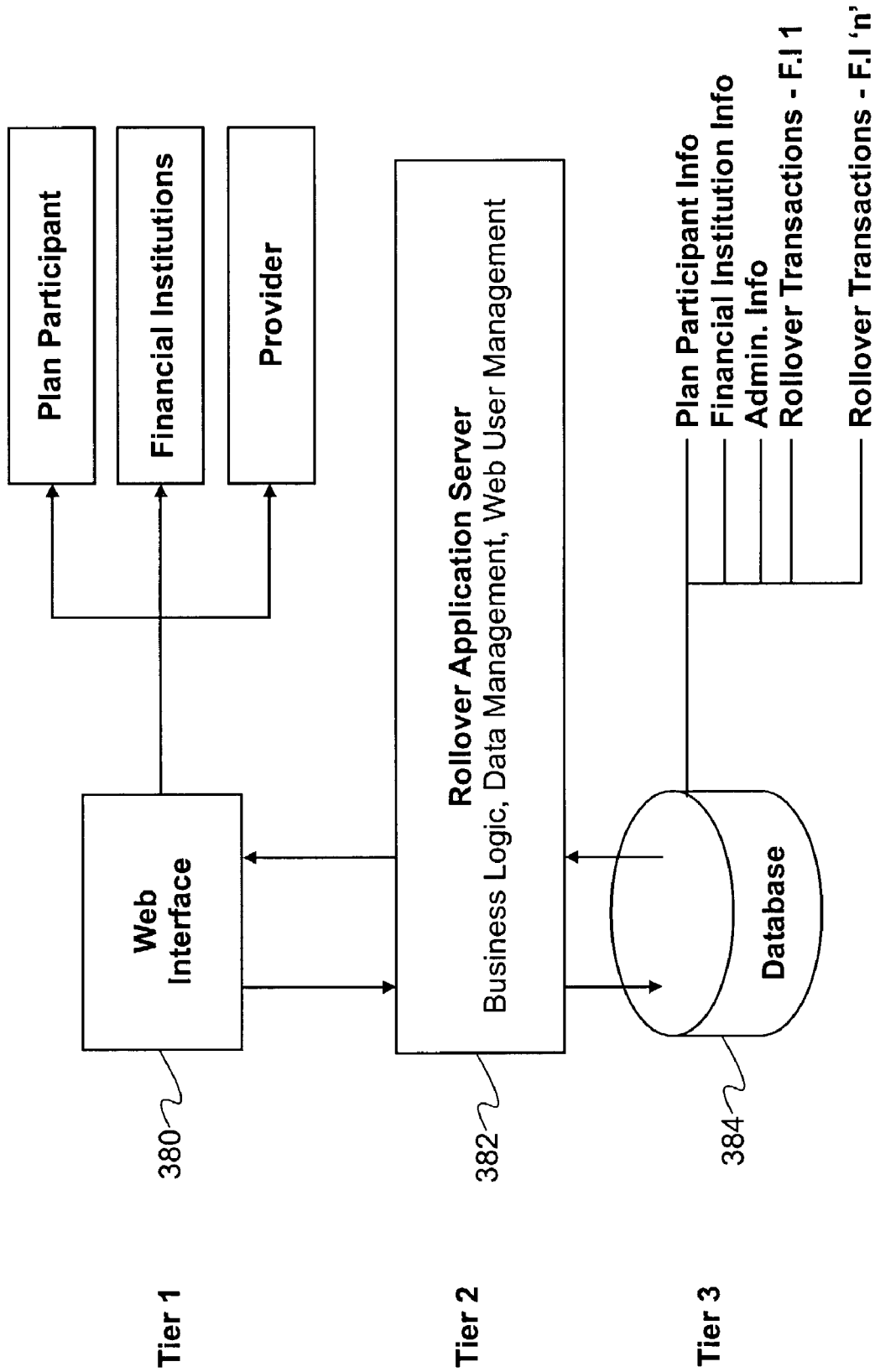
FIG. 28 is a functional block diagram of an illustrative software architecture in accordance with one embodiment of the present invention.

One or more applications may be implemented to provide such rollover marketplace features or systems. One example of a three-tier architecture for implementing a rollover marketplace application is illustratively shown in FIG. 28. With reference now to FIG. 28, the first tier of the application may include web interface 380. Web interface 380 may provide an Internet Word Wide Web interface supporting interaction with plan participants, financial institutions, a provider of the rollover market, and rollover application server 382. Rollover application server 382 may be the second tier of architecture. Rollover application server 382 provides business logic, data management, web user management, and access to database 384. Database 384 may be the third tier of the application. Database 384 may store plan participant information, financial institution information, system administrator information, rollover transaction information (e.g., for particular transactions), and other suitable information (if desired).

Thus, plan participant seeking a rollover transaction may receive competitive offers for their transaction that match their financial interests. Financial institutions may delineate their services with respect to each other. The rollover activity of a large pool of plan participants and financial institutions that provide rollover services may together be channeled through a rollover marketplace. A rollover marketplace environment may be established that streamlines the process for finding suitable financial institutions, for applying for a rollover, and for informing a financial institution (and its agents or brokers) of new applications. End-to-end solutions may be implemented that present access to a rollover marketplace environment from an intranet of an employer which gives access to the rollover marketplace to employees to various financial institutions that also have access to the rollover marketplace environment. Distributors may provide a separate marketplace environment or may driver activity through a marketplace environment of a provider.

The steps illustratively described in connection with FIGS. 2–7 and the interactive pages illustratively described in connection with FIG. 8–27 may be implemented using equipment illustratively described in connection with environment 100 of FIG. 1 and/or the architecture illustratively described in connection with FIG. 28.

For convenience and clarity, the word "page" is used herein to describe a graphical user interface through which a user interacts with the rollover marketplace environment. Other terms may also be used for these features.

For convenience and clarity, the graphical user interface discussed herein is discussed primarily in the context of web-based communications technique (e.g., HTTP). However, other forms of communications techniques may also be implemented (e.g., FTP, Telnet, etc.).

A computer readable medium such as a floppy disk, CD-ROM, DVD, etc. may be use to store the processes, techniques, and information illustratively described herein. Thus, a provider may implement a rollover marketplace in a distributed manner using several servers. This may also be used to provide such techniques to distributors. Computer readable medium and techniques for storing data on the medium are known to those skilled in the art.

The rollover marketplace environment may be for providing rollover services for 401(k) plans and for other defined contribution plans such as 403(b) plans.

In another aspect, the rollover service may be provided as an application layer to Internet users, to intranet software providers, through intranets, through enterprise software solutions, to third party administrators, record keepers, and other distribution channels for transacting rollovers. The application layer may be modular, may be scalable, and may be easily configured into existing points of electronic interface (e.g., users of electronic human resources) with consumers. Thus, the application layer may provide a service to financial institutions and other companies involved in retirement plans for transacting rollovers with consumers. In one aspect, in implementing the service, financial institutions and other companies involved in retirements plans may be given control over which offers are presented to consumers. In such cases, criteria that may have been selected by consumers may be ignored or used a secondary tool for presenting offers.

The trademarks of various financial institutions may have been sometimes used herein. Such trademarks may include trademarks for TD Waterhouse, Morgan Stanley, American Express, American Century, and Chase. Such trademarks are not being used to indicate the good will, support of, or affiliation with those companies.

It is to be understood that the invention is not to be limited to the exact configuration as illustrated and described herein. Accordingly, all expedient modifications readily attainable by one of ordinary skill in the art from the disclosure set forth herein, or by routine experimentation there from, are deemed to be within the spirit and scope of the invention as defined by the appended claims.

What is claimed is:

1. A computer-implemented method for providing a defined contribution plan rollover marketplace involving a plurality of networked computers, comprising:

providing a web portal to allow at least one consumer to compare different rollover options offered by different financial institutions, wherein the portal comprises a consumer computer interface that is configured for each consumer to interact with electronically to pursue at least one rollover of a defined contribution plan, wherein the consumer computer interface displays screens for pursuing rollovers;

permitting each consumer to interact with the consumer computer interface to electronically request to receive multiple rollover offers from one or more financial institutions; and presenting multiple account rollover offers in electronic form from the financial institutions to each consumer in response to that consumer's interaction with the consumer computer interface.

2. The method of claim 1 wherein the providing comprises providing an Internet communications interface with which consumers interact to pursue rollovers.

3. The method of claim 1 wherein the presenting comprises presenting an offer page through which that particular consumer can access the rollover offers.

4. The method of claim 1 wherein the presenting comprises presenting rollover offers for rollover of an employee 401(k) plan.

5. The method of claim 1 wherein the providing comprises providing the consumer computer interface to be one with which consumers interact to receive competitive rollover offers.

6. The method of claim 1 wherein the permitting comprises presenting each consumer with an opportunity to select criteria to be associated with their request for rollover offers.

7. The method of claim 6 wherein the presenting comprises identifying the multiple rollover offers from a database of available rollover offers based on the particular consumer's select criteria.

8. The method of claim 1 further comprising providing each financial institution with an opportunity to associate transaction criteria with their rollover offers.

9. The method of claim 8 wherein the presenting comprises identifying the multiple rollover offers from a database of available rollover offers based on the transaction criteria associated with the available rollover offers.

10. The method of claim 1 wherein the providing comprises providing an intranet interface with which consumers interact to pursue account rollovers.

11. The method of claim 10 wherein the intranet interface is a part of an enterprise software application of an employer of one or more of the consumers.

12. The method of claim 10 wherein the intranet interface further comprises an Internet portal therein located to permit consumers who interact therewith to pursue rollover transactions through the Internet.

13. The method of claim 1 wherein the intranet interface comprises multiple intranets in which each intranet interface is implemented and in which the intranet interface is adapted graphically to match its intranet host.

14. The method of claim 1 wherein the presenting comprises presenting the multiple offers side-by-side in a matrix.

15. The method of claim 1 wherein the presenting comprises presenting up to a predefined number of offers.

16. The method of claim 1 further comprising permitting one of the financial institutions to associate a filter with a rollover offer from that financial institution.

17. The method of claim 16 further comprising using the filter to identify whether to present the available rollover offer associated with that filter to each consumer.

18. The method of claim 1 further comprising presenting a report to one of the financial institutions with respect to activity in connection with that financial institution's rollover offers.

19. The method of claim 1 further comprising providing the particular consumer with an opportunity to select a desired one of the offers.

20. The method of claim 19 further comprising providing that consumer with an opportunity to enter application information for a rollover account application when that consumer selects one of the rollover offers.

21. The method of 20 further comprising storing the information entered by that consumer.

22. The method of claim 21 further comprising automatically electronically sending an alert to the financial institution whose rollover offer the particular consumer selected when a completed application for that selected offer is received.

23. The method of claim 22 further comprising making the stored information electronically available to the financial institution to which the alert is sent.

24. The method of claim 1 further comprising completing a rollover transaction using one of the presented offers that the particular consumer selects to use for the rollover transaction.

25. A computer-implemented method for alerting a financial institution of a defined contribution plan rollover transaction, comprising:
providing a web portal that provides a consumer with an opportunity to enter application information for a defined contribution plan rollover application when that consumer selects one of a number of rollover offers that were presented by two or more different financial institutions;
storing the information entered by that consumer in a database;
automatically electronically sending an alert to the financial institution whose rollover offer that consumer selected when a completed application for that selected offer is received; and
making the stored information electronically available to the financial institution to which the alert is sent.

26. The method of claim 25 further comprising providing the financial institution to which the alert was sent the opportunity to assign the application to an agent for handling.

27. The method of claim 26 further comprising sending a different alert to the agent when the financial institution assigns the application to the agent.

28. The method of claim 25 wherein the providing comprises associating an identifier with the application.

29. The method of claim 28 wherein the identifier is a bar code.

30. The method of claim 29 wherein the alert is automatically sent when the bar code is read upon receipt of the application.

31. A system for providing a defined contribution plan rollover marketplace through a consumer computer interface with which consumers interact to pursue rollovers, wherein the rollover marketplace involves a plurality of networked computers, comprising:
rollover service equipment configured to provide a web portal to allow each consumer to compare a plurality of different rollover options offered by different financial institutions, wherein the portal is configured to operate with the consumer computer interface to permit each consumer to interact with the consumer computer interface to electronically request to receive multiple rollover offers of defined contribution plans from the rollover service equipment,
wherein the consumer computer interface displays screens for pursuing the rollovers, and
wherein the consumer computer interface is further configured to present multiple rollover offers in electronic form from different financial institutions to each consumer in response to that consumer's interaction with the consumer computer interface to request rollover offers.

32. The system of claim 31 wherein the rollover service equipment is configured to operate with the consumer interface using an Internet communications interface with which consumers interact to pursue rollovers.

33. The system of claim 31 wherein the rollover service equipment is configured to present an offer page through which that particular consumer can access the rollover offers.

34. The system of claim 31 wherein the rollover service equipment is configured to present rollover offers for rollover of an employee 401(k) plan.

35. The system of claim 31 wherein rollover service equipment is configured to provide competitive rollover offers to consumers which interact with the system.

36. The system of claim 31 wherein the rollover service equipment is configured to present each consumer with an opportunity to select criteria to be associated with their request for rollover offers.

37. The system of claim 36 wherein the rollover service equipment is configured to identify the multiple rollover offers from a database of available rollover offers based on the particular consumer's select criteria.

38. The system of claim 31 wherein the rollover service equipment is configured to provide each financial institution with an opportunity to associate transaction criteria with their rollover offers.

39. The system of claim 38 wherein the rollover service equipment is configured to identify the multiple rollover offers from a database of available rollover offers based on the transaction criteria associated with the available rollover offers.

40. The system of claim 31 wherein the wherein the rollover service equipment is configured to include at least a portion that is resident on an intranet with which consumers interacts through an intranet interface to pursue account rollovers.

41. The system of claim 40 wherein the rollover service equipment is configured to operate with the intranet interface when the intranet interface is a part of an enterprise software application of an employer of one or more of the consumers.

42. The system of claim 40 wherein the rollover service equipment is configured to permit consumers to pursue rollover transactions through the Internet when the intranet interface includes an Internet portal.

43. The system of claim 40 wherein the rollover service equipment is configured to operate with intranet interfaces that are part of multiple intranets, and is configured in each intranet to graphically match the intranet interface hosted on that intranet.

44. The system of claim 31 wherein the rollover service equipment is configured to present the multiple offers side-by-side in a matrix.

45. The system of claim 31 wherein the rollover service equipment is configured to present up to a predefined number of offers.

46. The system of claim 31 wherein the rollover service equipment is configured permit one of the financial institutions to associate a filter with a rollover offer from that financial institution.

47. The system of claim 46 wherein the rollover service equipment is configured to use the filter to identify whether to present the available rollover offer associated with that filter to each consumer.

48. The system of claim 31 wherein the rollover service equipment is configured to present a report to one of the financial institutions with respect to activity in connection with that financial institution's rollover offers.

49. The system of claim 31 wherein the rollover service equipment is configured to provide the particular consumer with an opportunity to select a desired one of the offers.

50. The system of claim 49 wherein the rollover service equipment is configured to provide that consumer with an opportunity to enter application information for a rollover account application when that consumer selects one of the rollover offers.

51. The system of claim 50 wherein the rollover service equipment is configured to store the information entered by that consumer.

52. The system of claim 51 wherein the rollover service equipment is configured to automatically electronically send an alert to the financial institution whose rollover offer the particular consumer selected when a completed application for that selected offer is received.

53. The system of claim 52 wherein the rollover service equipment is configured to make the stored information electronically available to the financial institution to which the alert is sent.

54. The system of claim 31 wherein the rollover service equipment is configured to receive rollover information from that particular consumer in association with that consumer selected one of the presented offers to complete a rollover transaction with the offering financial institution.

55. A computer-based system for alerting a financial institution of a defined contribution plan rollover transaction, comprising:

rollover service computer equipment that is configured to provide a web portal that provides a consumer with an opportunity to enter application information electronically for a defined contribution plan rollover account application wherein the consumer selects one of a number of rollover offers that were presented by two or more financial institutions and the computer equipment is configured to store the information entered by that consumer in a database; and rollover management equipment that is configured to automatically electronically send an alert to the financial institution whose rollover offer that consumer selected when a completed application for that selected offer is received, and is configured to make the stored information electronically available to the financial institution to which the alert is sent.

56. The system of claim 55 wherein the rollover management equipment is configured to provide the financial institution to which the alert was sent the opportunity to assign the application to an agent for handling.

57. The system of claim 56 wherein the rollover management equipment is configured to send a different alert to the agent when the financial institution assigns the application to the agent.

58. The system of claim 55 wherein the rollover service equipment is configured to associate an identifier with the application.

59. The system of claim 58 wherein the rollover management equipment is configured to a bar code with the application as the identifier.

60. The system of claim 59 wherein the rollover management equipment is configured to automatically send the alert when the bar code is read upon receipt of the application.

61. The method of claim 1, further comprising preventing the presenting of multiple account rollover offers if any consumer request is incomplete.

62. The method of claim 1, which further comprises automatically entering from a database a portion of the information necessary for the consumer to electronically request to receive multiple rollover offers to alleviate the consumer's burden in entering information in the consumer computer interface.

* * * * *